United States Patent
Hashimoto et al.

(10) Patent No.: US 6,835,357 B2
(45) Date of Patent: Dec. 28, 2004

(54) EXHAUST EMISSION CONTROL SYSTEM FOR INTERNAL COMBUSTION ENGINE

(75) Inventors: Akira Hashimoto, Wako (JP); Kotaro Miyashita, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 844 days.

(21) Appl. No.: 09/828,901

(22) Filed: Apr. 10, 2001

(65) Prior Publication Data

US 2001/0028868 A1 Oct. 11, 2001

(30) Foreign Application Priority Data

Apr. 10, 2000 (JP) ........................................ 2000-107669
Aug. 8, 2000 (JP) ........................................ 2000-240093

(51) Int. Cl.[7] .......................... B01D 50/00; B01D 53/34
(52) U.S. Cl. ........................................ 422/177; 422/168
(58) Field of Search ................................ 422/177, 168, 422/169, 170, 171

(56) References Cited

U.S. PATENT DOCUMENTS 5,020,499 A * 6/1991 Kojima et al. ............... 123/479
5,771,685 A * 6/1998 Hepburn ....................... 60/274

FOREIGN PATENT DOCUMENTS

JP 2826564 9/1998
JP 10-299460 11/1998

* cited by examiner

Primary Examiner—M. Alexandra Elve
(74) Attorney, Agent, or Firm—Arent Fox

(57) ABSTRACT

An exhaust emission control system for an internal combustion engine having nitrogen oxides removing device provided in an exhaust system of the engine for removing nitrogen oxides in exhaust gases and an oxygen concentration sensor provided downstream of the nitrogen oxides removing device for detecting the concentration of oxygen in the exhaust gases. Deterioration of the nitrogen oxides removing device is determined on the basis of an output of the oxygen concentration sensor after the air-fuel ratio has been changed from the lean region to a rich region with respect to the stoichiometric ratio. Abnormality of the oxygen concentration sensor is determined on the basis of an output of the oxygen concentration sensor during a period in which the air-fuel ratio is kept in the rich region with respect to the stoichiometric ratio immediately after execution of the deterioration determination of the nitrogen oxides removing device.

12 Claims, 11 Drawing Sheets

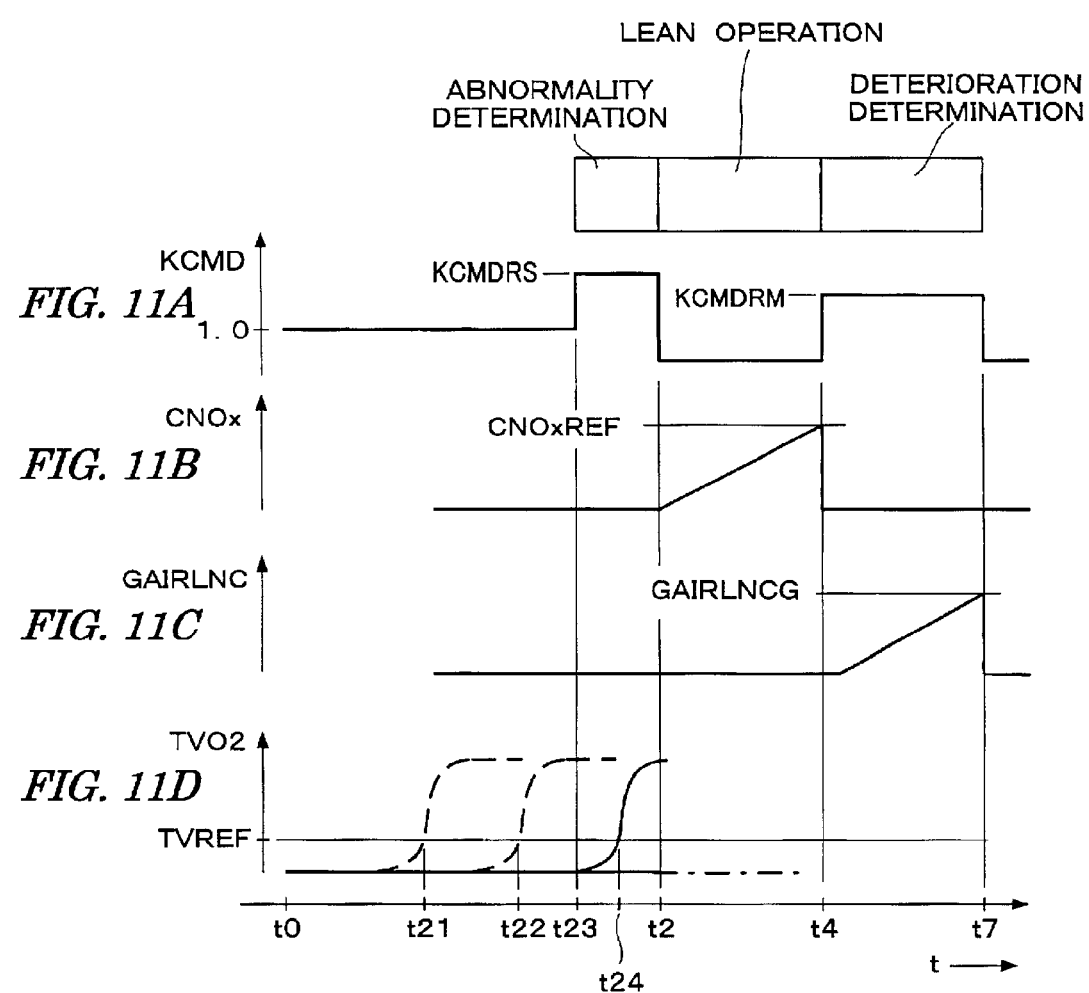

EXHAUST EMISSION CONTROL SYSTEM FOR INTERNAL COMBUSTION ENGINE

BACKGROUND OF THE INVENTION

The present invention relates to an exhaust emission control system for an internal combustion engine, and particularly to an exhaust emission control system which includes an NOx removing device for removing NOx (nitrogen oxides) and an oxygen concentration sensor arranged downstream of the NOx removing device, and determines deterioration of the NOx removing device and abnormality of the oxygen concentration sensor.

An exhaust emission control system in which a three-way catalyst for purifying exhaust gases is arranged in an exhaust system of an internal combustion engine and two oxygen concentration sensors are respectively provided upstream and downstream of the three-way catalyst is well known. In this system, an air-fuel ratio of an air-fuel mixture to be supplied to the engine is feedback-controlled according to outputs of the two oxygen concentration sensors. With respect to this exhaust emission control system, a method for determining abnormality of the downstream oxygen concentration sensor is disclosed in Japanese Patent Publication No. 2826564.

In this abnormality determining method, the air-fuel ratio is changed to the rich region with respect to the stoichiometric ratio and is held in the rich region when an output of the oxygen concentration sensor arranged downstream of the three-way catalyst exhibits a lean air-fuel ratio. If the output of the downstream oxygen concentration sensor exhibits a lean air-fuel ratio over a predetermined time period, while the output of the oxygen concentration sensor arranged upstream of the three-way catalyst exhibits a rich air-fuel ratio, it is determined that the downstream oxygen concentration sensor is abnormal.

When the air-fuel ratio of the air-fuel mixture supplied to an internal combustion engine is set to the lean region with respect to the stoichiometric ratio, that is, when a so-called lean operation is carried out, the amount of NOx exhausted from the engine tends to increase. To cope with the NOx, a technique for reducing exhaust emission has been known, in which an NOx removing device containing an NOx absorbent for absorbing NOx is provided in an exhaust system of the engine, to thereby reduce the exhaust emission. Another technique is known where an oxygen concentration sensor provided downstream of an NOx removing device determines the deterioration of the NOx removing device according to an output of the downstream oxygen concentration sensor (Japanese Patent Laid-open No. Hei 10-299460).

In the operation of an engine having an NOx removing device, a lean operation is carried out for a long period of time. Therefore, the output of an oxygen concentration sensor arranged downstream of the NOx removing device, in the exhaust system, exhibits a lean air-fuel ratio for a long period of time. Further, when the air-fuel ratio is set to a rich region, NOx absorbed in the NOx removing device is reduced.

Accordingly, if the technique disclosed in the above document, Japanese Patent Publication No. 2826564, is applied to the oxygen concentration sensor arranged downstream of the NOx removing device, it is difficult to appropriately execute the abnormality determination at a suitable timing when the output of the oxygen concentration sensor changes. Specifically, in order to positively change an output of an oxygen concentration sensor provided downstream of an NOx removing device to a rich region, it may often required to continue to operate in the rich region over a long period of time. This may cause an adverse effect on the exhaust emission characteristic and the engine drivability.

Further, in the operation of an engine having an NOx removing device, a large proportion of time is spent in lean operation. Therefore, it may be expected that an abnormality in a downstream oxygen concentration sensor can be rapidly determined.

SUMMARY OF THE INVENTION

It is accordingly an object of the present invention to provide an exhaust emission control system for an internal combustion engine that is capable of executing abnormality determination of an oxygen concentration sensor provided downstream of an NOx removing device with suitable timing, to suppress the adverse effects of the abnormality determination on the exhaust emission characteristic and the engine drivability.

To achieve the above object, according to an aspect of the present invention, there is provided an exhaust emission control system for an internal combustion engine, including: nitrogen oxides removing means provided in an exhaust system of the engine for removing nitrogen oxides in exhaust gases in a condition where an air-fuel ratio of an air-fuel mixture supplied to the engine is set to a lean region with respect to a stoichiometric ratio; an oxygen concentration sensor provided downstream of the nitrogen oxides removing means for detecting the concentration of oxygen in the exhaust gases; deterioration determining means for determining deterioration of the nitrogen oxides removing means on the basis of an output of the oxygen concentration sensor after the air-fuel ratio has been changed from the lean region to a rich region with respect to the stoichiometric ratio; and abnormality determining means for determining abnormality of the oxygen concentration sensor on the basis of an output of the oxygen concentration sensor during a period in which the air-fuel ratio is kept in the rich region with respect to the stoichiometric ratio immediately after execution of the deterioration determination by the deterioration determining means.

With this configuration, the deterioration determination of the nitrogen oxides removing means is executed on the basis of the output of the oxygen concentration sensor downstream of the nitrogen oxides removing means after the air-fuel ratio of an air-fuel mixture to be supplied to the engine has been changed from the lean region to the rich region, and the abnormality of the oxygen concentration sensor is determined on the basis of the output of the oxygen concentration sensor during a period in which the air fuel-ratio is kept in the rich region with respect to the stoichiometric ratio immediately after execution of the deterioration determination. Since the air-fuel ratio is changed to the rich region by executing the deterioration determination of the NOx removing means and thereby the amount of NOx absorbed in the NOx removing means is reduced, the oxygen concentration on the downstream side of the NOx removing means can be positively lowered by keeping the air-fuel ratio in the rich region only for a very short period of time after the deterioration determination of the NOx removing means. Accordingly, the abnormality determination of the oxygen concentration sensor can be accurately performed by monitoring the output of the oxygen concentration sensor in the above very short period of time in which the air-fuel ratio is kept in the rich region after the deterioration determination. That is, by performing the abnormality determination of the oxygen concentration sensor immediately after the deterioration determination of the NOx removing means, it is possible to minimize the period of time in which the enrichment of the air-fuel ratio is kept for the abnormality determination, and hence to suppress the adverse effect of the enrichment on the exhaust emission characteristic and the drivability of the engine.

In the above exhaust emission control system, preferably, the abnormality determination by the abnormality determining means is executed if the output of the oxygen concentration sensor is unchanged before the end of the deterioration determination by the deterioration determining means.

With this configuration, the abnormality determination by the abnormality determining means is executed if the output of the oxygen concentration sensor is unchanged before the end of the deterioration determination by the deterioration determining means. In other words, if the output of the oxygen concentration sensor has changed before the end of the deterioration determination by the deterioration determining means, it can be determined that the oxygen concentration sensor is normal. Accordingly, by executing the abnormality determination when the output of the oxygen concentration sensor is unchanged until the end of the deterioration determination, it is possible to minimize the enrichment of the air-fuel ratio for the abnormality determination.

The abnormality determining means, preferably, determines that the oxygen concentration sensor is abnormal if the output of the oxygen concentration sensor is not changed from a value indicative of a lean air-fuel ratio to a value indicative of a rich air-fuel ratio within a predetermined period when the enrichment of the air-fuel ratio is continued over the predetermined period immediately after the end of the deterioration determination.

The exhaust emission control system, preferably, further includes determination inhibiting means for inhibiting the abnormality determination by the abnormality determining means immediately after starting of the engine.

According to another aspect of the present invention, there is provided an exhaust emission control system for an internal combustion engine, including: nitrogen oxides removing means provided in an exhaust system of the engine for removing nitrogen oxides in exhaust gases in a condition where an air-fuel ratio of an air-fuel mixture supplied to the engine is in a lean region with respect to a stoichiometric ratio; an oxygen concentration sensor provided downstream of the nitrogen oxides removing means for detecting the concentration of oxygen in the exhaust gases; deterioration determining means for determining deterioration of the nitrogen oxides removing means on the basis of an output of the oxygen concentration sensor after the air-fuel ratio has been changed from the lean region to a rich region with respect to the stoichiometric ratio; and abnormality determining means for determining that the oxygen concentration sensor is abnormal if a condition where the output of the oxygen concentration sensor indicates that the air-fuel ratio is in the rich region with respect to the stoichiometric ratio continues before execution of the deterioration determination by the deterioration determining means.

With this configuration, the deterioration determination of the nitrogen oxides removing means is executed on the basis of the output of the oxygen concentration sensor downstream of the nitrogen oxides removing means after the air-fuel ratio of an air-fuel mixture supplied to the engine changes from the lean region to the rich region with respect to the stoichiometric ratio, and it is determined that the oxygen concentration sensor is abnormal if a condition where the output of the oxygen concentration sensor is in the rich region with respect to the stoichiometric ratio is continued before execution of the deterioration determination by the deterioration determining means. Since the oxygen concentration sensor is inactive at the time of cold starting of the engine, the output of the oxygen concentration sensor indicates a rich air-fuel ratio. On the other hand, the deterioration determination of the nitrogen oxides removing means is executed when the amount of NOx absorbed in the nitrogen oxides removing means has reached a predetermined amount. Accordingly, unless the output of the oxygen concentration sensor changes to a value indicative of a lean air-fuel ratio before execution of the deterioration determination, it can be determined that the oxygen concentration sensor is abnormal. As a result, it is possible to perform the abnormality determination of the oxygen concentration sensor before execution of the deterioration determination of the nitrogen oxides removing device, to thereby quickly determine the abnormality of the oxygen concentration sensor and eliminate the need of continuing the enrichment of the air-fuel ratio immediately after execution of the deterioration determination. This is effective to eliminate the adverse effects of enrichment on the exhaust emission characteristic and drivability of the engine.

The exhaust emission control system, preferably, further includes determination inhibiting means for inhibiting the abnormality determination by the abnormality determining means immediately after starting of the engine.

According to a further aspect of the present invention, there is provided an exhaust emission control system including: nitrogen oxides removing means provided in an exhaust system of the engine for removing nitrogen oxides in exhaust gases in a condition where an air-fuel ratio of an air-fuel mixture supplied to the engine is in a lean region with respect to a stoichiometric ratio; a downstream oxygen concentration sensor provided downstream of the nitrogen oxides removing means for detecting the concentration of oxygen in the exhaust gases; enrichment means for setting the air-fuel ratio to a rich region with respect to the stoichiometric ratio when a condition where the output of the downstream oxygen concentration sensor indicates that the air-fuel ratio is in the lean region with respect to the stoichiometric ratio continues after the end of starting of the engine; abnormality determining means for determining abnormality of the downstream oxygen concentration sensor on the basis of the output of the downstream oxygen concentration sensor during execution of the air-fuel enrichment by the enrichment means; and lean operation inhibiting means for inhibiting that the air-fuel ratio is set to the lean region with respect to the stoichiometric ratio until the end of the abnormality determination of the downstream oxygen concentration sensor.

With this configuration, the air-fuel ratio is set to the rich region with respect to the stoichiometric ratio if a condition where the output of the downstream oxygen concentration sensor indicates that the air-fuel ratio is in the lean region continues after the end of starting of the engine, and the abnormality of the oxygen concentration sensor is determined on the basis of the output from the oxygen concentration sensor during execution of the enrichment of the air-fuel ratio. In addition, the setting of the air-fuel ratio to the lean region with respect to the stoichiometric ratio is inhibited until the abnormality determination ends. Accordingly, the abnormality determination of the oxygen concentration can be performed before starting of the lean operation, that is, before the amount of NOx absorbed in the NOx removing device increases after starting of the engine, so that it is possible to minimize the enrichment execution period of time for the abnormality determination, to thereby minimize the adverse effect of enrichment on the exhaust emission characteristic and the drivability of the engine.

The enrichment of the air-fuel ratio by the enrichment means is, preferably, allowed after a vehicle on which the engine is mounted begins running.

The exhaust emission control system, preferably, further includes: an upstream oxygen concentration sensor provided upstream of the nitrogen oxides removing means for detecting the concentration of oxygen in the exhaust gases; and deterioration determining means for determining deterioration of the nitrogen oxides removing means on the basis of an output of the downstream oxygen concentration sensor after the air-fuel ratio has been changed from the lean region to a rich region with respect to the stoichiometric ratio. In this system, the deterioration determining means comprises deterioration determination enrichment means for switching the air-fuel ratio from the lean region to the rich region with respect to the stoichiometric ratio, and a reducing component amount calculating means for calculating an amount of reducing components flowing into the nitrogen oxides removing means from the time when the output of the upstream oxygen concentration sensor has changed to a value indicative of a rich air-fuel ration after starting of the enrichment of the air-fuel ratio by the abnormality determination enrichment means. The deterioration determining means determines deterioration of the nitrogen oxides removing means on the basis of the amount of the reducing components calculated by the reducing component amount calculating means and the output of the downstream oxygen concentration sensor.

Preferably, the deterioration determining means determines that the nitrogen oxides removing means is deteriorated if the output of the downstream oxygen concentration sensor indicates a rich air-fuel ratio when the amount of the reducing components has reached a predetermined amount.

The reducing component amount calculating means, preferably, calculates the amount of the reducing components by integrating the amount of the exhaust gases flowing in the nitrogen oxides removing means.

The reducing component amount calculating means, preferably, uses a basic fuel amount, which is set so that the air-fuel ratio becomes a constant value according to a rotational speed and an absolute intake pressure of the engine, as a parameter indicative of the amount of exhaust gases flowing into the nitrogen oxides removing device.

Other objects and features of the invention will be more fully understood from the following detailed description and appended claims when taken with the accompanying drawings.

BRIEF DESCRIPTION OF THE DRAWINGS

FIGS. 11A to 11D are time charts illustrating the processings shown in FIGS. 8 to 10.

DETAILED DESCRIPTION OF THE PREFERRED EMBODIMENTS

The currently preferred embodiments of the present invention will now be described with reference to the drawings.

First Preferred Embodiment

Figure 1:
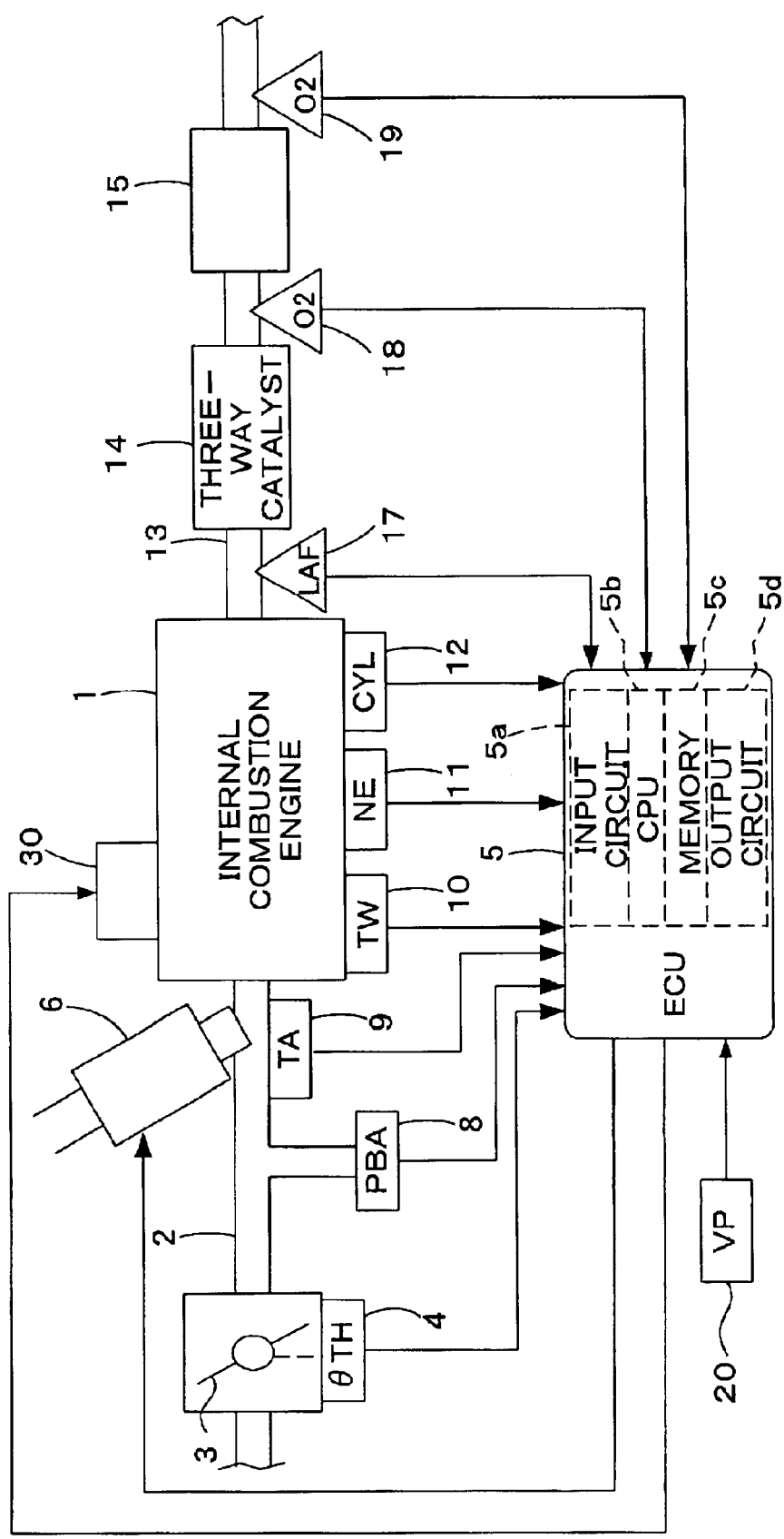
FIG. 1 is a schematic diagram showing a configuration of an internal combustion engine and an exhaust emission control system therefor according to a first preferred embodiment of the present invention.

Referring to FIG. 1, there is schematically shown a general configuration of an internal combustion engine (which will be hereinafter referred to as "engine") and a control system therefor, including an exhaust emission control system according to a preferred embodiment of the present invention. The engine 1 may be a four-cylinder engine. Engine 1 has an intake pipe 2 provided with a throttle valve 3. A throttle valve opening angle (θ TH) sensor 4 is connected to the throttle valve 3. The sensor 4 outputs an electrical signal corresponding to an opening angle of the throttle valve 3 and supplies the electrical signal to an electronic control unit (which will be hereinafter referred to as "ECU") 5 for controlling engine 1.

Fuel injection valves 6, only one of which is shown, are inserted into the intake pipe 2 at locations intermediate between the cylinder block of the engine 1 and the throttle valve 3 and slightly upstream of the respective intake valves (not shown). These fuel injection valves 6 are connected to a fuel pump (not shown), and electrically connected to the ECU 5. A valve opening period of each fuel injection valve 6 is controlled by a signal output from the ECU 5.

An absolute intake pressure (PBA) sensor 8 is provided immediately downstream of the throttle valve 3. An absolute pressure signal converted to an electrical signal by the absolute intake pressure sensor 8, is supplied to the ECU 5. An intake air temperature (TA) sensor 9 is provided downstream of the absolute intake pressure sensor 8 to detect an intake air temperature TA. An electrical signal corresponding to the detected intake air temperature TA, is output from sensor 9 and supplied to ECU 5.

An engine coolant temperature (TW) sensor 10 such as a thermistor is mounted on the body of the engine 1 to detect an engine coolant temperature (cooling water temperature) TW. A temperature signal corresponding to the detected engine coolant temperature TW is output from sensor 10 and supplied to ECU 5.

An engine rotational speed (NE) sensor 11 and a cylinder discrimination (CYL) sensor 12 are mounted in facing relation to a camshaft or a crankshaft (both not shown) of the engine 1. The engine rotational speed sensor 11 outputs a TDC signal pulse at a crank angle position located at a predetermined crank angle before the top dead center (TDC) corresponding to the start of an intake stroke of each cylinder of the engine 1 (at every 180° crank angle in the case of a four-cylinder engine). The cylinder discrimination sensor 12 outputs a cylinder discrimination signal pulse at a predetermined crank angle position for a specific cylinder of engine 1. These signal pulses output from sensors 11 and 12 are supplied to ECU 5.

An exhaust pipe 13 of the engine 1 is provided with a three-way catalyst 14 and an NOx removing device 15 as a nitrogen oxide removing means arranged downstream of the three-way catalyst 14.

The three-way catalyst 14 has an oxygen storing capacity, and has the function of storing some of the oxygen contained in the exhaust gases in the exhaust lean condition where the air-fuel ratio of an air-fuel mixture to be supplied to the engine 1 is set in a lean region with respect to the stoichiometric ratio and the oxygen concentration in the exhaust gases is therefore relatively high. The three-way catalyst 14 also has the function of oxidizing HC and CO contained in the exhaust gases by using the stored oxygen in the exhaust rich condition where the air-fuel ratio of the air-fuel mixture to be supplied to the engine 1 is set in a rich region with respect to the stoichiometric ratio and the oxygen concentration in the exhaust gases is therefore low with a large proportion of HC and CO components.

The NOx removing device 15 contains an NOx absorbent for absorbing NOx and a catalyst for accelerating oxidation and reduction. In the exhaust lean condition where the air-fuel ratio of the air-fuel mixture to be supplied to the engine 1 is set in the lean region with respect to the stoichiometric ratio, the NOx absorbent functions to absorb NOx. On the other hand, in the exhaust rich condition where the air-fuel ratio of the air-fuel mixture to be supplied to the engine 1 is in the vicinity of the stoichiometric ratio or in the rich region with respect to the stoichiometric ratio, the NOx absorbent functions to discharge the absorbed NOx, thereby reducing the discharged NOx into nitrogen gas by HC and CO and oxidizing the reducing components HC and CO into water vapor and carbon dioxide.

When the amount of NOx absorbed by the NOx absorbent reaches the limit of its NOx absorbing capacity, i.e., the maximum NOx absorbing amount, the NOx absorbent cannot absorb any more NOx. Accordingly, to discharge the absorbed NOx and reduce it, the air-fuel ratio is enriched, that is, reduction enrichment of the air-fuel ratio is performed.

A proportional type air-fuel ratio sensor (which will be hereinafter referred to as "LAF sensor") 17 is mounted on the exhaust pipe 13 at a position upstream of the three-way catalyst 14. The LAF sensor 17 outputs an electrical signal substantially proportional to the oxygen concentration (air-fuel ratio) in the exhaust gases, and supplies the electrical signal to the ECU 5.

A binary type oxygen concentration sensor (which will be hereinafter referred to as "O2 sensor") 18 is mounted on the exhaust pipe 13 at a position between the three-way catalyst 14 and the NOx removing device 15, and an O2 sensor 19 is mounted on the exhaust pipe 13 at a position downstream of the NOx removing device 15. Detection signals from these sensors 18 and 19 are supplied to the ECU 5. Each of the O2 sensors 18 and 19 has a characteristic such that its output rapidly changes in the vicinity of the stoichiometric ratio. More specifically, the output from each of the sensors 18 and 19 has a high level in a rich region with respect to the stoichiometric ratio, and outputs a low level signal in a lean region with respect to the stoichiometric ratio.

The engine 1 has a valve timing switching mechanism 30 capable of switching the valve timing of intake valves and exhaust valves between a high-speed valve timing suitable for a high-speed operating region of the engine 1 and a low-speed valve timing suitable for a low-speed operating region of the engine 1. This switching of the valve timing also includes switching of a valve lift amount. Further, when selecting the low-speed valve timing, one of the two intake valves in each cylinder is stopped to ensure stable combustion even in the case of setting the air-fuel ratio lean with respect to the stoichiometric ratio.

The valve timing switching mechanism 30 is of such a type that the switching of the valve timing is carried out hydraulically. That is, a solenoid valve for performing the hydraulic switching and an oil pressure sensor are connected to the ECU 5. A detection signal from the oil pressure sensor is supplied to the ECU 5, and the ECU 5 controls the solenoid valve to perform the switching control of the valve timing according to an operating condition of the engine 1.

A vehicle speed sensor 20 detects the running speed (vehicle speed) VP of a vehicle driven by engine 1. The speed sensor 20 is connected to the ECU 5, and supplies a detection signal to the ECU 5.

The ECU 5 includes an input circuit $5a$ having various functions including a function of shaping the waveforms of input signals from the various sensors, a function of correcting the voltage levels of the input signals to a predetermined level, and a function of converting analog signal values into digital signal values, a central processing unit (which will be hereinafter referred to as "CPU") $5b$, a memory $5c$ preliminarily storing various operational programs to be executed by the CPU $5b$ and for storing the results of computation or the like by the CPU $5b$, and an output circuit $5d$ for supplying drive signals to the fuel injection valves 6.

The CPU $5b$ determines various engine operating conditions according to various engine operating parameter signals as mentioned above, and calculates a fuel injection period TOUT of each fuel injection valve 6 to be opened in synchronism with the TDC signal pulse, in accordance with Eq. (1) according to the above determined engine operating conditions.

$$TOUT = TIM \times KCMD \times KLAF \times K1 + K2 \qquad (1)$$

TIM is a basic fuel amount, more specifically, a basic fuel injection period of each fuel injection valve 6, and it is determined by retrieving a TI map set according to the engine rotational speed NE and the absolute intake pressure PBA. The TI map is set so that the air-fuel ratio of an air-fuel mixture to be supplied to the engine 1 becomes substantially equal to the stoichiometric ratio in an operating condition according to the engine rotational speed NE and the absolute intake pressure PBA. That is, the basic fuel amount TIM has a value substantially proportional to an intake air amount (mass flow) per unit time by the engine.

KCMD is a target air-fuel ratio coefficient, which is set according to engine operational parameters such as the engine rotational speed NE, the throttle valve opening angle θ TH, and the engine coolant temperature TW. The target air-fuel ratio coefficient KCMD is proportional to the reciprocal of an air-fuel ratio A/F, i.e., proportional to a fuel-air ratio F/A, and takes a value of 1.0 for the stoichiometric ratio, KCMD is also referred to as a target equivalent ratio. Further, in the case of executing reduction enrichment or determination of deterioration of the NOx removing device 15 to be hereinafter described, the target air-fuel ratio coefficient KCMD is set to a predetermined enrichment value KCMDRR or KCMDRM for enrichment of the air-fuel ratio.

KLAF is an air-fuel ratio correction coefficient calculated by PID control so that a detected equivalent ratio KACT calculated from a detected value from the LAF sensor 17 becomes equal to the target equivalent ratio KCMD in the case that the conditions for execution of feedback control are satisfied.

K1 is a correction coefficient and K2 is correction variable computed according to various engine parameter signals. The correction coefficient K1 and correction variable K2 are set to predetermined values that optimize various characteristics such as fuel consumption characteristics and engine acceleration characteristics according to engine operating conditions.

The CPU 5b supplies a drive signal for opening each fuel injection valve 6 according to the fuel injection period TOUT obtained above through the output circuit 5d to the fuel injection valve 6.

Figure 2:
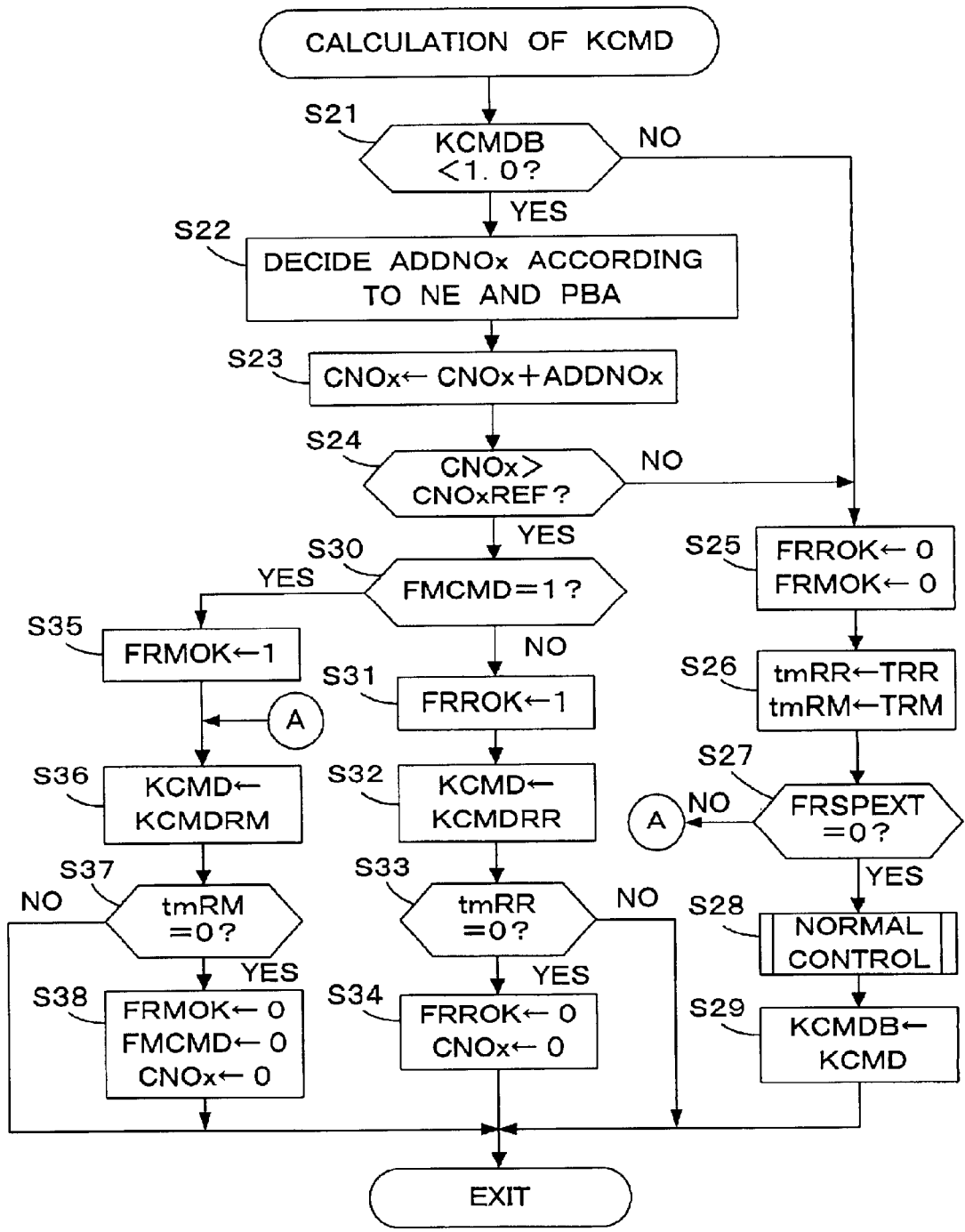
FIG. 2 is a flowchart showing a program for calculating a target air-fuel ratio coefficient (KCMD) in the first preferred embodiment.

FIG. 2 is a flowchart showing a program for calculating the target air-fuel ratio coefficient KCMD applied to Eq. (1) mentioned above. This program is executed by the CPU 5b at predetermined time intervals.

In step S21, it is determined whether or not the engine 1 is in a lean operating condition, that is, whether or not a stored value KCMDB of the target air-fuel ratio coefficient KCMD stored in step S29 described below during normal control is smaller than "1.0". If KCMDB is greater than or equal to "1.0", which indicates that the engine 1 is not in the lean operating condition, the program proceeds directly to step S25, in which a reduction enrichment flag FRROK is set to "0" and a deterioration determination enrichment flag FRMOK is also set to "1". The flag FRROK when set to "1" indicates the duration of execution of reduction enrichment and the flag FRMOK when set to "1" indicates the duration of execution of air-fuel ratio enrichment for deterioration determination of the NOx removing device 15.

Thereafter, a reduction enrichment time TRR (e.g., 5 to 10 sec) is set to a downcount timer tmRR to be referred in step S33 described below, and a deterioration determination enrichment time TRM that is longer than the reduction enrichment time TRR is set to a downcount timer tmRM to be referred in step S37 also described below. Then, the timers tmRR and tmRM are started (step S26).

Then, it is determined whether or not an enrichment continuation flag FRSPEXT is "0" (step S27). The flag FRSPEXT is set by the processing shown in FIG. 5 and indicates, when set to "1", that the enrichment of the air-fuel ratio is continued after the end of the deterioration determination of the NOx removing device 15. If FRSPEXT is "1", the program proceeds to step S36 described below, in which the enrichment of the air-fuel ratio is continued.

On the other hand, if FRSPEXT is "0", normal control is performed, that is, the target air-fuel ratio coefficient KCMD is set according to engine operating conditions (step S28). The target air-fuel ratio coefficient KCMD is basically calculated according to the engine speed NE and the absolute intake pressure PBA, and in a condition where the engine coolant temperature TW is low or in a predetermined high-load operating condition, the set value of the target air-fuel ratio coefficient KCMD is changed according to these conditions. Then, the target air-fuel ratio coefficient KCMD calculated in step S28 is stored as the stored value KCMDB (step S29), and this program ends.

If KCMDB is less than "1.0" in step S21, which indicates that the engine 1 is in the lean operating condition, an increment value ADDNOx to be used in step S23 is decided according to the engine speed NE and the absolute intake pressure PBA (step S22). The increment value ADDNOx is a parameter corresponding to the amount of NOx exhausted per unit time during the lean operation, and this parameter is set so that it increases with an increase in engine speed NE and an increase in absolute intake pressure PBA.

In step S23, the increment value ADDNOx decided in step S22 is applied to the following expression to increment an NOx amount counter CNOx, thereby obtaining an NOx exhaust amount, that is, a count value corresponding to the amount of NOx absorbed in the NOx absorbent.

$$CNOx = CNOx + ADDNOx$$

In step S24, it is determined whether or not the current value of the NOx amount counter CNOx has exceeded an allowable value CNOxREF. If the answer to step S24 is negative (NO), the program proceeds to step S25 and the following steps. Unless the enrichment continuation flag FRSPEXT is set to "1", the normal control in which the target air-fuel ratio coefficient KCMD is set according to the engine operating conditions is performed. The allowable value CNOxREF is set to a value corresponding to an NOx amount slightly smaller than the maximum NOx absorption amount of NOx in the NOx absorbent.

If CNOx is greater than CNOxREF in step S24, then it is determined whether or not a deterioration determination command flag FMCMD is "1" (step S30). The flag FMCMD when set to "1" indicates that the execution command for the deterioration determination for the NOx removing device 15 is active.

It is sufficient to execute the deterioration determination for the NOx removing device 15 about once per engine operation period (a period from starting to stopping of the engine). Therefore, the deterioration determination command flag FMCMD is set to "1" at the time the engine operating condition becomes stable after starting the engine. Usually the flag FMCMD is set to "0". Therefore, the program proceeds from step S30 to step S31, in which the reduction enrichment flag FRROK is set to "1". Subsequently, the target air-fuel ratio coefficient KCMD is set to a predetermined enrichment value KCMDRR corresponding to a value equivalent to an air-fuel ratio of 14.0, thus executing reduction enrichment (step S32). Then, it is determined whether or not the current value of the timer tmRR is "0" (step S33). If tmRR is not "0", this program ends. When tmRR is "0", the reduction enrichment flag FRROK is set to "0" and the current value of the NOx amount counter CNOx is reset to "0" (step S34). Accordingly, the answer to step S24 subsequently becomes negative (NO), so that the normal control is then performed.

If CNOx is greater than CNOxREF in step S24, in the condition where the deterioration determination command has been issued (FMCMD=1), the program proceeds from step S30 to step S35, in which the deterioration determination enrichment flag FRMOK is set to "1". Subsequently, the target air-fuel ratio coefficient KCMD is set to a predetermined deterioration determination enrichment value KCMDRM. Where "1" is less than KCMDRM and KCMDRM is less than KCMDRR. This value of KCMDRM corresponds to a value slightly shifted to the lean region from a value equivalent to an air-fuel ratio of 14.0, thus executing deterioration determination enrichment (step S36). The reason for making the degree of enrichment smaller in the execution of deterioration determination than the degree of enrichment of the usual reduction enrichment is that if the degree of enrichment is large and the enrichment execution time is short, an improper determination may occur. Accordingly, by reducing the degree of enrichment and increasing the enrichment execution time TRM, the accuracy of deterioration determination can be improved.

Subsequently, it is determined whether or not the current value of the timer tmRM is "0" (step S37). If tmRM is not "0", this program ends. When tmRM is "0", both the deterioration determination enrichment flag FRMOK and the deterioration determination command flag FMCMD are set to "0", and the current value of the NOx amount counter CNOx is reset to "0" (step S38). Accordingly, the answer to step S24 subsequently becomes negative (NO), so that the normal control is then performed.

According to the processing shown in FIG. 2, the reduction enrichment is executed intermittently in an engine operating condition where the lean operation is permitted, so that NOx absorbed by the NOx absorbent in the NOx removing device 15 is discharged at appropriate intervals. Further, in the case that the deterioration determination command is issued, the deterioration determination enrichment is executed so that the degree of enrichment is made smaller than the degree of the reduction enrichment and that the execution time period TRM is made longer than the execution time period of the reduction enrichment.

Figure 5:
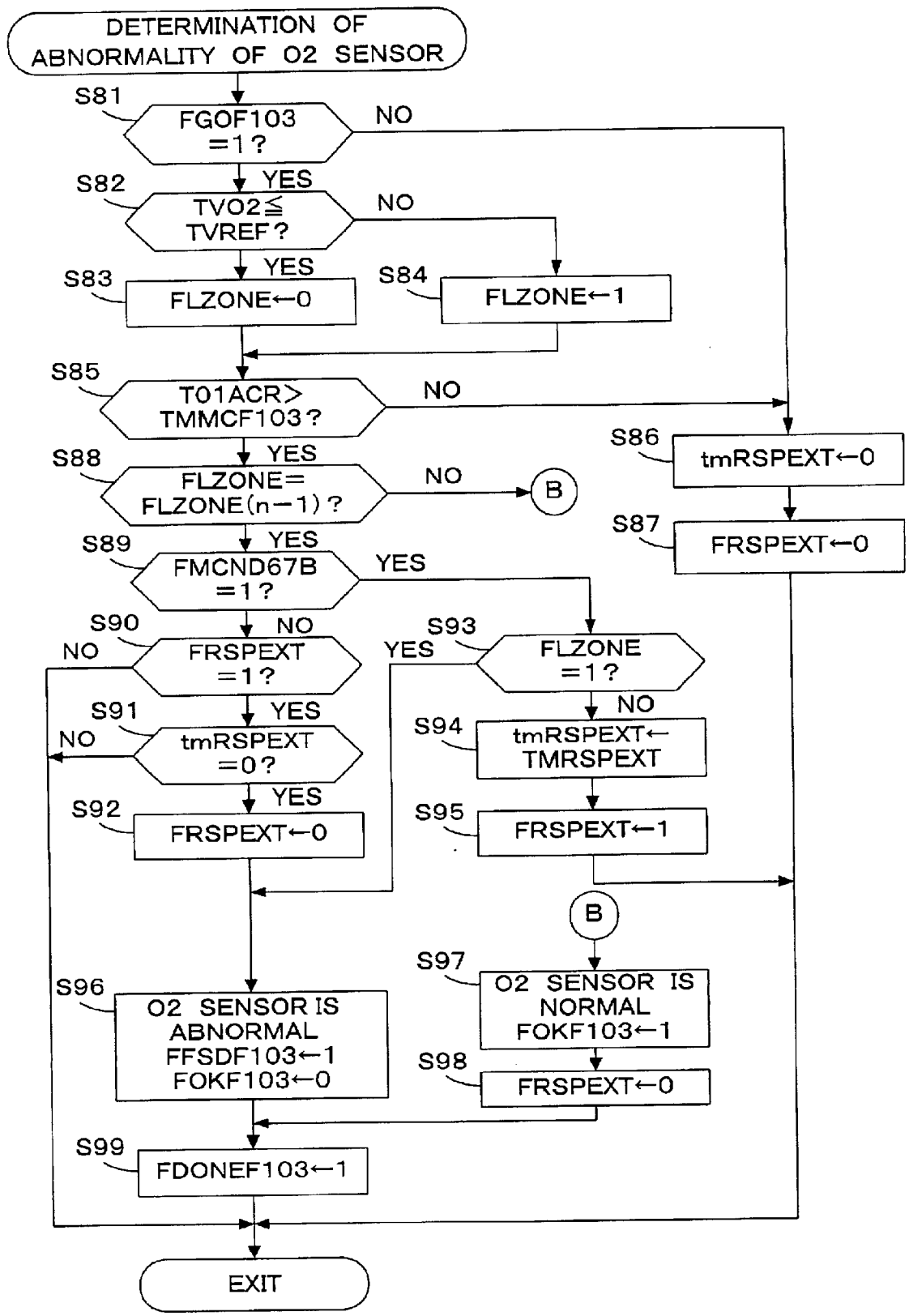
FIG. 5 is a flow chart for showing a program for executing abnormality determination of an oxygen concentration sensor arranged downstream of the NOx removing device in the first preferred embodiment.

If the enrichment continuation flag FRSPEXT is set to "1" in the processing shown in FIG. 5 and checked at step 27, discussed above, the target air-fuel ratio coefficient KCMD is kept at the predetermined enrichment value KCMDRM to thereby continue the air-fuel ratio enrichment even after the end of the deterioration determination of the NOx removing device 15.

Figure 3:
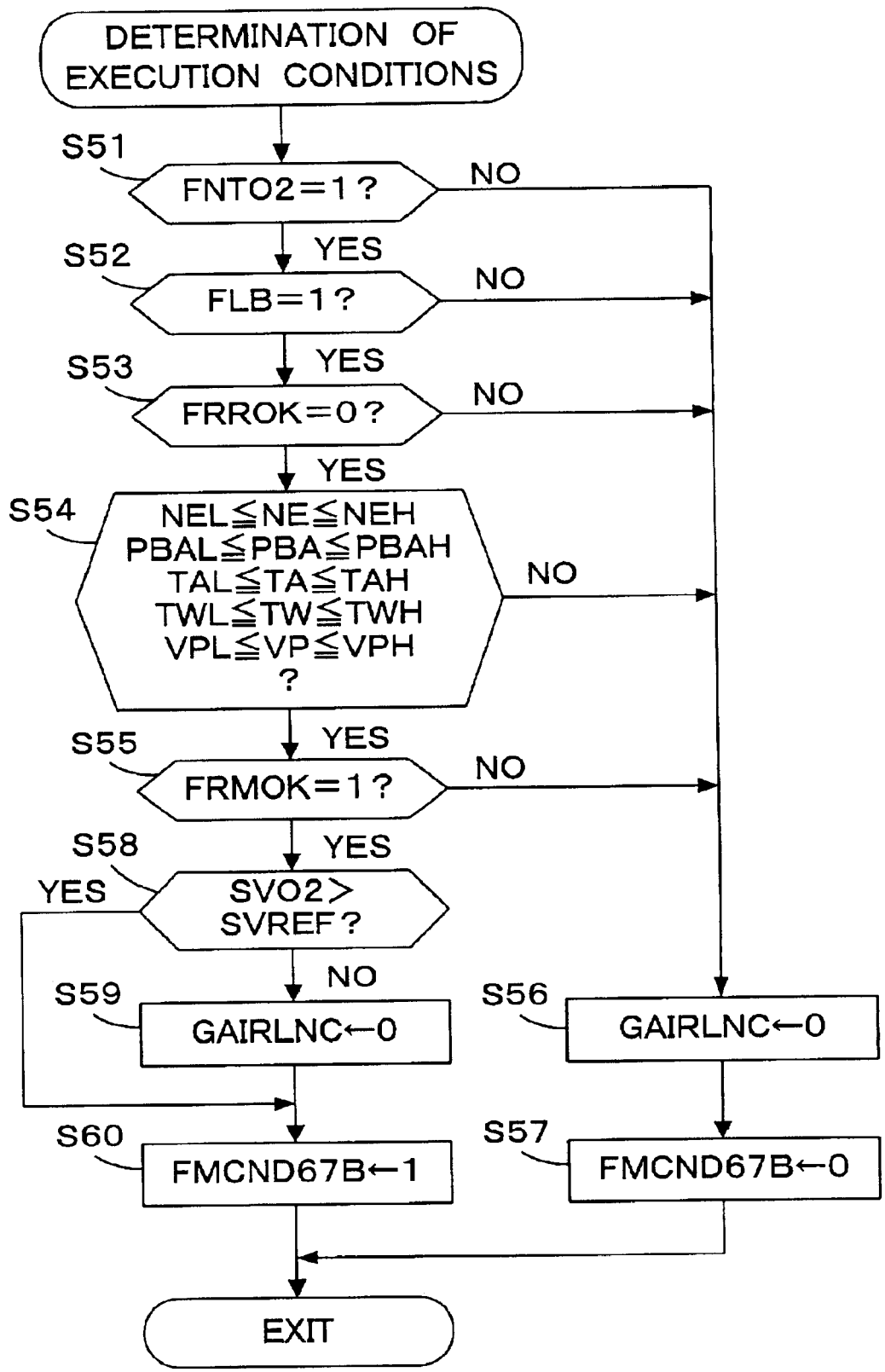
FIG. 3 is a flow chart for showing a program for determining execution conditions for deterioration determination of an NOx removing device in the first preferred embodiment.

FIG. 3 is a flowchart showing a program for determining execution conditions for deterioration determination of the NOx removing device 15. This program is executed by the CPU $5b$ in synchronism with the generation of a TDC signal pulse.

In step S51, it is determined whether or not an activation flag FNTO2 is "1". The flag FNTO2 when set to "1" indicates that the downstream O2 sensor 19 is activated. If FNTO2 is "1", that is, if the downstream O2 sensor 19 has been activated, it is then determined whether or not a lean operation flag FLB is "1" (step S52). The flag FLB when set to "1" indicates the permission for lean operation, in which the air-fuel ratio is set in a lean region with respect to the stoichiometric ratio If FLB is "1", it is then determined whether or not the reduction enrichment flag FRROK is "0" (step S53).

If the answer to any step S51, S52, or S53 is negative (NO), an exhaust amount parameter GAIRLNC is set to "0" (step S56). The exhaust amount parameter GAIRLNC is calculated and used in the processing shown in FIG. 4 described below. Thereafter, the execution conditions flag FMCND67B is set to "0". Flag FMCND67B indicates the satisfaction of execution conditions of the deterioration determination when set to "1" (step S57). Then, this program ends.

If the answers to steps S51, S52, and S53 are all affirmative (YES), then the program determines whether or not the engine operating condition is normal (step S54). More specifically, it is determined whether or not: the engine rotational speed NE is between a predetermined upper limit NEH (e.g., 3000 rpm) and a predetermined lower limit NEL (e.g., 1200 rpm); the absolute intake pressure PBA falls within the range of a predetermined upper limit PBAH (e.g., 88 kPa) and a predetermined lower limit PBAL (e.g., 21 kPa); the intake air temperature TA is within the range of a predetermined upper limit TAH (e.g., 100° C.) and a predetermined lower limit TAL (e.g., -7° C.); the engine coolant temperature TW is within the range of a predetermined upper limit TWH (e.g., 100° C.) and a predetermined lower limit TWL (e.g., 75° C.); and the vehicle speed VP is within the range of a predetermined upper limit VPH (e.g., 120 km/h) and a predetermined lower limit VPL (e.g., 35 km/h). If at least one of these conditions is not satisfied, the answer to step S54 becomes negative (NO) and the program proceeds to step S56. When all of these conditions are satisfied, the answer to step S54 becomes affirmative (YES) and the program proceeds to step S55, in which it is determined whether or not the deterioration determination enrichment flag FRMOK is "1".

Until the NOx amount absorbed by the NOx absorbent in the NOx removing device 15 becomes almost maximum (saturated condition) and the deterioration determination enrichment flag FRMOK is set to "1" in the processing of FIG. 2, the program proceeds from step S55 to step S56. If FRMOK is "1", then the program determines whether or not an output voltage SVO2 from the upstream O2 sensor 18 has exceeded a reference voltage SVREF corresponding to the stoichiometric ratio (step S58). During a certain period of time after starting the deterioration determination enrichment, HC and CO are oxidized in the three-way catalyst 14, so that the output voltage SVO2 continues to be smaller than the reference voltage SVREF. Accordingly, the program proceeds from step S58 to step S59, in which the exhaust amount parameter GAIRLNC is set to "0". Then, the execution conditions flag FMCND67B is set to "1" (step S60), and this program ends.

When the oxygen stored in the three-way catalyst 14 is depleted and the exhaust condition in the vicinity of the O2 sensor 18 becomes an exhaust rich condition, the output voltage SVO2 exceeds the reference voltage SVREF. Accordingly, the program proceeds from step S58 directly to step S60 without the execution of step S59.

Figure 4:
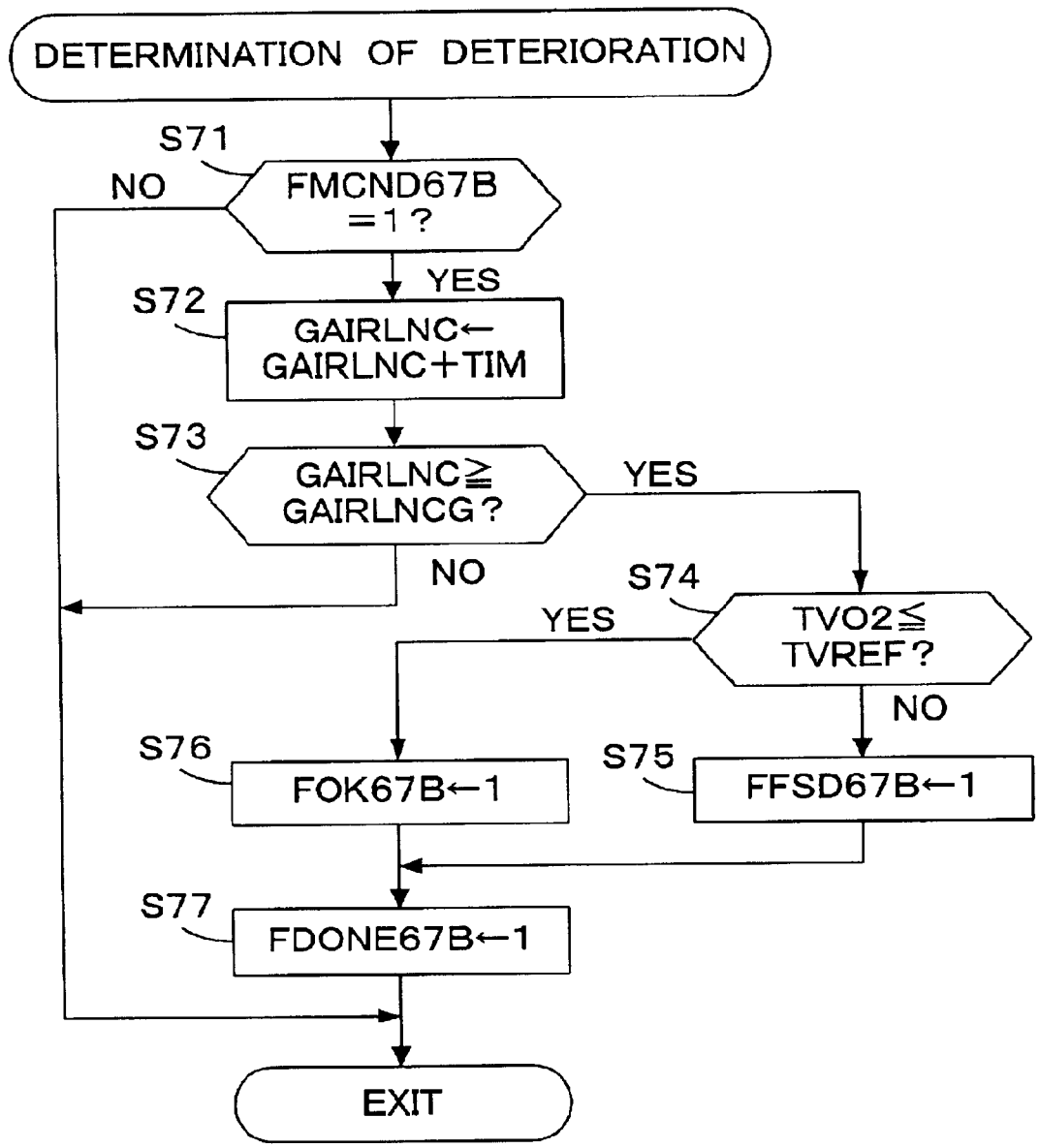
FIG. 4 is a flowchart showing a program for executing the deterioration determination of the NOx removing device.

FIG. 4 is a flowchart showing a program for executing deterioration determination of the NOx removing device 15. This program is executed by the CPU $5b$ in synchronism with the generation of a TDC signal pulse.

In step S71, it is determined whether or not the execution condition flag FMCND67B is "1". If FMCND67B is "0", which indicates that the execution conditions are not satisfied, this program ends at once. If FMCND67B is "1", the program proceeds to step S72, in which the exhaust amount parameter GAIRLNC is calculated from Eq. (2).

$$GAIRLNC=GAIRLNC+TIM \qquad (2)$$

In the above equation, TIM is a basic fuel amount, which is a fuel amount set so that the air-fuel ratio becomes the stoichiometric ratio according to the engine operating conditions (engine speed NE and absolute intake pressure PBA). Accordingly, The basic fuel amount TIM is a parameter proportional to an intake air amount per unit time by the engine 1, that is, proportional to an exhaust amount per unit time by the engine 1. While SVO2 is lower than or equal to SVREF, the exhaust amount parameter GAIRLNC is kept at "0" by the processing shown in FIG. 3. Accordingly, the exhaust amount parameter GAIRLNC indicative of a cumulative value of the amount of exhaust gases flowing into the NOx removing device 15 from the time the output voltage SVO2 from the upstream O2 sensor 18 has exceeded the reference voltage SVREF, is obtained by the calculation of step S72. Further, during the execution of the deterioration determination, the air-fuel ratio is kept at a fixed rich air-fuel ratio (a value corresponding to KCMDRM) in a rich region with respect to the stoichiometric ratio. Therefore, the exhaust amount parameter GAIRLNC has a value proportional to a cumulative value of the amount of the reducing components (HC and CO) contained in the exhaust gases.

In step S73, it is determined whether or not the exhaust amount parameter GAIRLNC is larger than or equal to a predetermined threshold value GAIRLNCG. Since GAIRLNC is less than GAIRLNCG at first, this program ends. When GAIRLNC becomes equal to or greater than GAIRLNCG, the program proceeds from step S73 to step S74, in which it is determined whether or not an output voltage TVO2 from the downstream O2 sensor 19 is higher than a reference voltage TVREF (e.g., 0.3 V) corresponding to the stoichiometric ratio. If TVO2 is lower than or equal to TVREF, it is determined that the NOx removing device 15 is normal, and a normal flag FOK67B is set to "1", indicating the normality of the NOx removing device 15 (step S76). Then an end flag FDONE67B is set to "1", indicating the end of the deterioration determination (step S77), and this program ends.

On the other hand, if TVO2 is higher than TVREF in step S74, which indicates that the output TVO2 from the downstream O2 sensor 19 changes to a value indicative of a rich air-fuel ratio when the exhaust amount parameter GAIRLNC has become the predetermined threshold value GAIRLNCG or more, it is determined that the NOx removing device 15 is deteriorated, and a deterioration flag FFSD67B is set to "1", indicating the deterioration of the NOx removing device 15 (step S75). Then, the program proceeds to step S77.

The predetermined threshold GAIRLNCG is set, for example, to a value corresponding to about ½ of the exhaust amount required to reduce all of the amount of NOx absorbed by a new NOx removing device. In this case, if the output voltage TVO2 from the downstream O2 sensor 19 becomes a value indicative of a rich air-fuel ratio (a value higher than the reference voltage TVREF) when the exhaust amount parameter GAIRLNC has become equal to or greater than the predetermined threshold value GAIRLNCG, it is indicated that the NOx storing ability of the NOx removing device 15 has been reduced to about ½ or less of that of the new one. Alternatively, the predetermined threshold GAIRLNCG may be set to a value so as to detect that the NOx storing ability has been reduced to about ¹⁄₁₀ of that of a new NOx removing device. Thus, the predetermined threshold GAIRLNCG may be set to any suitable value according to the deterioration level intended to be detected.

As described, in the processings shown in FIGS. 2 to 4, the exhaust amount parameter GAIRLNC indicative of the amount of the exhaust gases, i.e., the amount of the reducing components flowing into the NOx removing device 15 from the time the output voltage SVO2 from the upstream O2 sensor 18 changes to a value indicative of a rich air-fuel ratio after starting of the deterioration determination enrichment. Further, if the output voltage TVO2 from the downstream O2 sensor 19 becomes a value indicative of a rich air-fuel ratio before the calculated exhaust amount parameter GAIRLNC reaches the predetermined threshold GAIRLNCG, it is determined that the NOx removing device 15 is deteriorated. Accordingly, the deterioration determination of the NOx removing device 15 can be performed according to the exhaust amount, i.e., the amount of the reducing components, changing with an engine operating condition, thus allowing precise deterioration determination over wide ranges of the engine operating conditions.

FIG. 5 is a flow chart showing a program for executing abnormality determination of the downstream O2 sensor 19. This program is executed by the CPU 5b in synchronization with the generation of a TDC signal pulse.

In step S81, the program determines whether or not an abnormality determination allowing flag FGOF103 is set to "1". The flag FGOF103 when set to "1" indicates the permission of execution of the abnormality determination of the O2 sensor 19. If FGOF103 is "0", which indicates that the abnormality determination is not permitted, a value of a downcount timer tmRSPEXT to be referred in step S91 described below is set to "0" (step S86), and an enrichment continuation flag FRSPEXT is set to "0" (step S87). The FRSPEXT when set to "1" indicates that the enrichment of the air-fuel ratio is continued after the above deterioration determination of the NOx removing device 15. This is the flag checked in step S27 of FIG. 2. Then, this program ends.

If FGOF103 is "1" in step S81, which indicates that the abnormality determination is permitted, it is then determined whether or not the output TVO2 from the downstream O2 sensor 19 is lower than or equal to the reference voltage TVREF (step S82). If TVO2 is lower than or equal to TVREF, a rich flag FLZONE is set to "0" (step S83), whereas if TVO2 is higher than TVREF, the rich flag FLZONE is set to "1" (step S84). Accordingly, the rich flag FLZONE when set to "1" indicates the exhaust rich condition. It should be noted that if the O2 sensor 19 is not activated, the output TVO2 from the O2 sensor 19 is higher than the reference voltage TVREF. Accordingly, the output TVO2 is higher than TVREF immediately after the cold starting of the engine 1.

In step S85, it is determined whether or not a value of an upcount timer T01ACR for counting a time after the end of starting of the engine 1 is larger than a predetermined time TMMCF103 (e.g., 3 sec). If T01ACR is less than or equal to TMMCF103, which indicates the condition immediately after starting of the engine 1, the program proceeds to step S86. That is, the abnormality determination is not executed.

When T01ACR becomes greater than TMMCF103, the program determines whether or not the current value of the rich flag FLZONE is equal to the previous value (FLZONE (n−1)). If the current value of the rich flag FLZONE is not equal to the previous value (FLZONE (n−1)), that is, if the value of the flag FLZONE is changed from "0" to "1" or from "1" to "0", which indicates that the output TVO2 of the O2 sensor 19 is changed from that in the initial condition, it is determined that the O2 sensor 19 is normal. Accordingly, an O2 sensor OK flag FOKF103 is set to "1" indicating the normality of the O2 sensor 19 (step S97) and the enrichment continuation flag FRSPEXT is set to "0" (step S98). Then, an O2 sensor abnormality determination end flag FDONEF103 is set to "1" indicating the end of the O2 sensor abnormality determination by "1" (step S99), and this program ends.

If FLZONE is equal to FLZONE (n−1) in step S88, it is then determined whether or not the execution condition flag FMCND67B is "1" (step S89). If FMCND67B is "0", which indicates that the deterioration determination execution conditions are not satisfied, it is then determined whether or not the enrichment continuation flag FRSPEXT is "1" (step S90). Since FRSPEXT is "0" before execution of step S95 described below, this program ends at first.

If FMCND67B is "1", which indicates that the deterioration determination execution conditions are satisfied, the program proceeds from step S89 to step S93, in which it is determined whether or not the rich flag FLZONE is "1". If FLZONE is "1", which indicates that the output TVO2 from the O2 sensor 19 is kept at a value higher than the reference voltage TVREF, it is determined that the O2 sensor 19 is abnormal. If the O2 sensor 19 is normal, the sensor 19 should be activated when the deterioration determination execution conditions are satisfied, so that the output TVO2 becomes lower than the reference voltage TVREF. Accordingly, if TVO2 is greater than TVREF, it is determined that the O2 sensor 19 is abnormal.

Then, an O2 sensor abnormality flag FFSDF103 is set to "1" and the O2 sensor OK flag FOKF103 is set to "0", indicating the abnormality of the O2 sensor 19 (step S96). The program proceeds to step S99, in which the O2 sensor abnormality determination end flag FDONEF103 is set to "1". If the flag FFSDF103 is set to "1", for example, an alarm lamp (not shown) for informing an operator of the abnormality of the O2 sensor 19 is turned on.

On the other hand, if FLZONE is "0", which indicates that the output TVO2 from the O2 sensor 19 is kept at a value lower than the reference voltage TVREF, an enrichment extension time TMRSPEXT (e.g., 10 sec) is set to a down-count timer tmRSPEXT and the timer tmRSPEXT is started (step S94). Then, the enrichment continuation flag FRSPEXT is set to "1" (step S95), and this program ends.

By setting the enrichment continuation flag FRSPEXT to "1", the target air-fuel ratio coefficient KCMD is kept at the predetermined enrichment value KCMDRM even after the end of the deterioration determination of the NOx removing device 15 (see steps S27 and S36 shown in FIG. 2).

Since the execution condition flag FMCND67B is reset to "0" after the end of the deterioration determination of the NOx removing device 15, the program proceeds from step S89 to step S90. In this case, since FRSPEXT is "1", the program proceeds to step S91, in which it is determined whether or not the current value of the timer tmRSPEXT is "0". While tmRSPEXT is greater than "0", the program ends at once. If the output TVO2 from the O2 sensor 19 exceeds the reference voltage TVREF during the period of time in which tmRSPEXT is greater than "0", the program proceeds from step S88 to step S97, in which it is determined that the O2 sensor 19 is normal.

On the other hand, if tmRSPEXT becomes "0" in the condition where the output TVO2 from the O2 sensor 19 is kept lower than the reference voltage TVREF, the enrichment continuation flag FRSPEXT is reset to "0" (step S92), and it is determined that the O2 sensor 19 is abnormal. Then, the program proceeds to step S96. In this case, although the enrichment of the air-fuel ratio has been continued over the extension time TMRSPEXT after the end of the deterioration determination of the NOx removing device 15, the output TVO2 from the O2 sensor 19 does not changes to a value higher than the reference voltage TVREF, that is, a value indicative of a rich air-fuel ratio. Therefore, it is determined that the O2 sensor 19 is abnormal.

FIGS. 6A to 6E and FIGS. 7A to 7C are time charts illustrating the deterioration determination of the NOx removing device 15 and the abnormality determination of the O2 sensor 19 in accordance with the programs shown in FIGS. 2 to 5.

Figure 6:
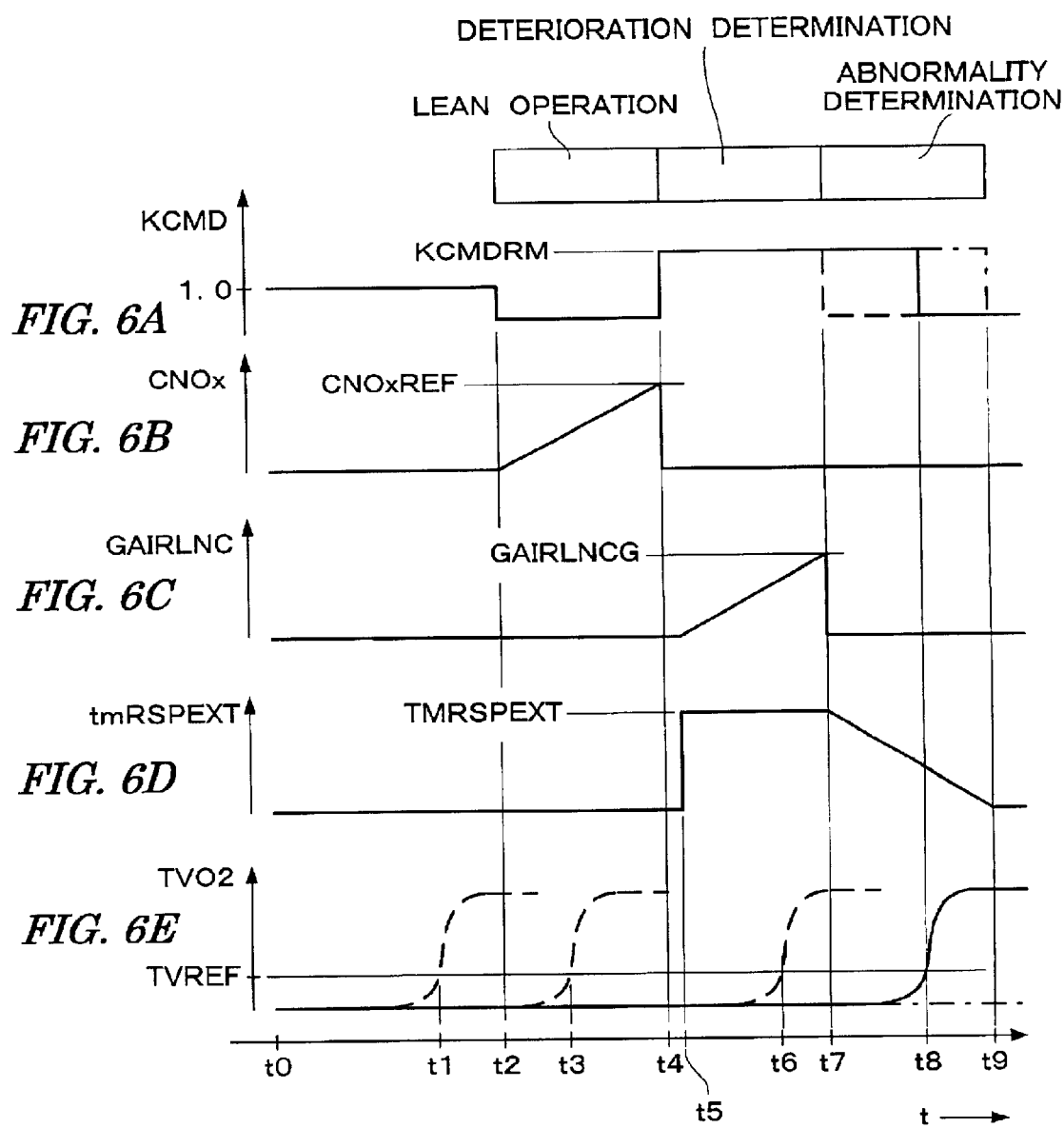
FIGS. 6A to 6E are time charts illustrating the processings shown in FIGS. 2 to 5.

Referring to FIGS. 6A to 6E, the engine 1 is started at a time t0, the lean operation is started at a time t2 (see FIG. 6A), and the deterioration determination of the NOx removing device 15 is executed during a period between a time t4 at which the value of the NOx counter CNOx reaches the allowable value CNOxREF (see FIG. 6B) to a time t7 at which the exhaust amount parameter GAIRLNC reaches the predetermined threshold value GAIRLNCG (see FIG. 6C).

The time charts shown in FIGS. 6A to 6E are for the case where the output TVO2 from the O2 sensor 19 is initially lower than the reference voltage TVREF (the case where the O2 sensor 19 fails or the case where the O2 sensor 19 is initially activated, for example, at the time of hot restarting of the engine). If the output TVO2 from the O2 sensor exceeds the reference voltage TVREF, as shown by a broken line in FIG. 6E, at a time t1, t3, or t6 before a time t7 at which the deterioration determination ends, it is determined that the O2 sensor 19 is normal. In this case, as shown by a broken line in FIG. 6A, the enrichment extension for the abnormality determination of the O2 sensor 19 is not executed.

On the other hand, if the output TVO2 from the O2 sensor 19 does not exceed the reference voltage TVREF until the time t7, the target air-fuel ratio coefficient KCMD is kept at the predetermined enrichment value KCMDRM. In this case, if the output TVO2 from the O2 sensor 19 exceeds the reference voltage TVREF, as shown by a solid line in FIG. 6E, at a time t8 before a time t9 at which the value of the timer tmRSPEXT becomes "0" (see FIG. 6D), it is determined that the O2 sensor 19 is normal, and the abnormality determination ends, whereas if TVO2 is lower than TVREF is held until the time t8 as shown by a dash line in FIG. 6E, the air-fuel ratio enrichment is continued until the time t9. Then, it is determined that the O2 sensor 19 is abnormal, if TVO2 is further kept lower than TVREF until the time t9.

Figure 7:
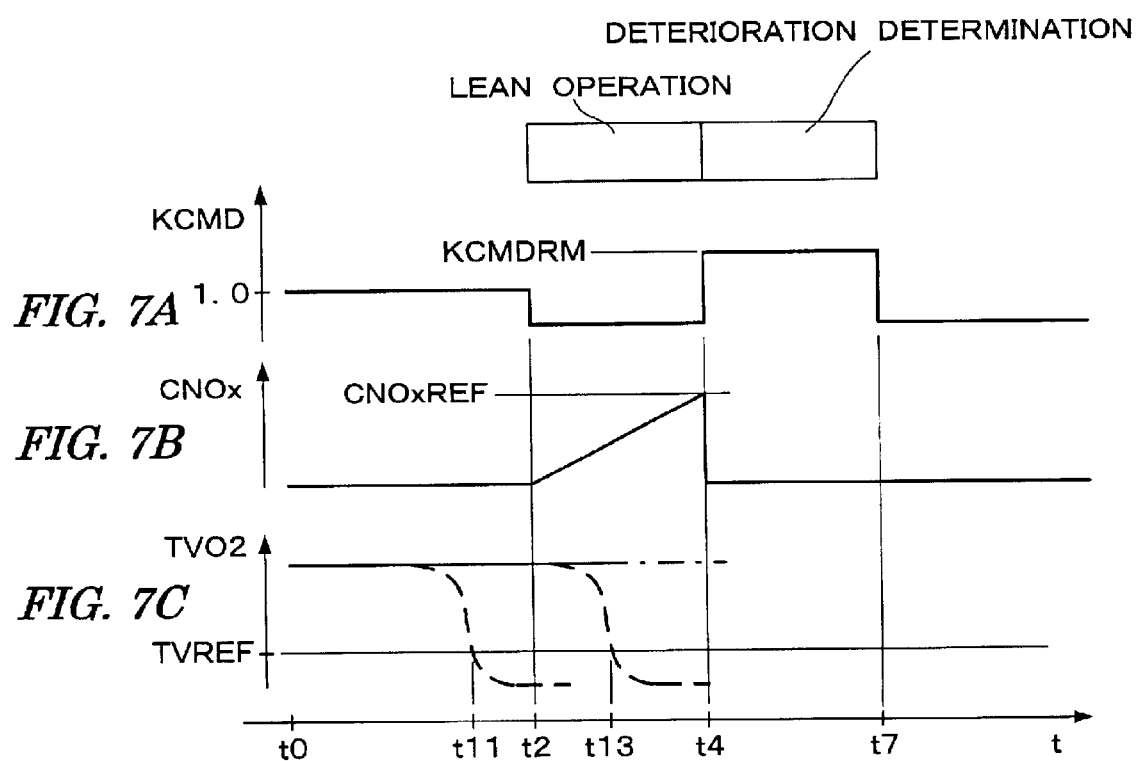
FIGS. 7A to 7C are time charts illustrating the processings shown in FIGS. 2 to 5.

The time charts shown in FIGS. 7A to 7C are for the case where the output TVO2 from the O2 sensor 19 is initially higher than the reference voltage TVREF (the case wherer the O2 sensor 19 fails or the case where the O2 sensor 19 is inactive, for example, at the time of cold starting of the engine). If the output TVO2 from the O2 sensor 19 changes to a value lower than the reference voltage TVREF, as shown by a broken line in FIG. 7C, at a time t11 or t13 before a time t4 at which the deterioration determination is started, it is determined that the O2 sensor 19 is normal. In contrast, if TVO2 is kept higher than TVREF until the time t4 as shown by a dash line in FIG. 7C, it is determined that the O2 sensor 19 is abnormal. This is because if the O2 sensor 19 is normal, the O2 sensor 19 is activated by the time t4 and thereby the output TVO2 therefrom changes to a value indicative of a lean air-fuel ratio.

As described above, according to this preferred embodiment, the deterioration determination of the NOx removing device 15 is executed on the basis of the output TVO2 from the O2 sensor downstream of the NOx removing device 15 after the target air-fuel ratio coefficient KCMD has been changed from the lean region with respect to the stoichiometric ratio to the predetermined enrichment value KCMDRM, and the abnormality determination of the O2 sensor 19 is executed on the basis of the output TVO2 from the O2 sensor 19 during a period of time in which the target air-fuel ratio coefficient KCMD is kept at the predetermined enrichment value KCMDRM immediately after the execution of the deterioration determination (see the time chart in FIG. 6A, in which the air-fuel ratio enrichment is continued after the deterioration determination). Since the air-fuel ratio is enriched by executing the deterioration determination of the NOx removing device 15, the amount of NOx absorbed in the NOx removing device 15 is reduced. Accordingly, the oxygen concentration on the downstream side of the NOx removing device 15 can be positively lowered by keeping the air-fuel ratio in the rich region only in a very short period of time after the execution of the deterioration determination, so that the abnormality of the O2 sensor 19 can be accurately determined by monitoring the output from the O2 sensor 19 during the above very short period of time in which the air-fuel ratio is kept in the rich region. That is, by executing the abnormality determination of the O2 sensor 19 immediately after the deterioration determination of the NOx removing device, it is possible to minimize the air-fuel ratio enrichment time period for the abnormality determination, to thereby suppress the adverse effect of the enrichment on the exhaust emission characteristic and the drivability of the engine.

According to this preferred embodiment, if the output from the O2 sensor 19 does not change before the end of the deterioration determination of the NOx removing device 15, the enrichment continuation flag FRSPEXT is set to "1", to continue the enrichment for the abnormality determination. If the output TVO2 from the O2 sensor changes until the end of the deterioration determination of the NOx removing device 15, it is determined that the O2 sensor 19 is normal. Accordingly, by executing the air-fuel ratio enrichment for the abnormality determination only in the case other than the case where the output from the O2 sensor changes by the end of the deterioration determination, it is possible to minimize the air-fuel ratio enrichment for the abnormality determination.

According to this embodiment, if the output TVO2 from the O2 sensor is continuously kept at a value higher than the reference voltage TVREF, that is, a value indicative of an air-fuel ratio in the rich region with respect to the stoichiometric ratio until the deterioration determination of the NOx removing device 15 is started, it is determined that the O2 sensor 19 is abnormal (see FIGS. 7A to 7C). Specifically, since the O2 sensor 19 is inactive at cold starting of the engine, the output therefrom becomes a value indicative of a rich air-fuel ratio. On the other hand, since the deterioration determination of the NOx removing device 15 is executed when the amount of NOx absorbed in the NOx removing device 15 reaches a predetermined value after continuation of the lean operation, if the output TVO2 from the O2 sensor does not change to a value indicative of a lean air-fuel ratio, that is, a value lower than the reference voltage TVREF until the execution of the deterioration determination, it can be determined that the O2 sensor 19 is abnormal. Accordingly, the abnormality determination of the O2 sensor 19 can be executed before the start of the deterioration determination of the NOx removing device 15, which makes it possible to quickly determine the abnormality of the O2 sensor and eliminate the need of keeping the rich air-fuel ratio after the execution of the deterioration determination, to thereby eliminate the adverse effect of the enrichment on the exhaust emission characteristic and the drivability of the engine.

Additionally, in this embodiment, while the deterioration determination of the NOx removing device 15 is executed by using the O2 sensor 19, it may occur that the O2 sensor 19 is not determined to be normal even when the deterioration determination is ended, for example, in the case where the enrichment continuation flag FRSPEXT is set to "1" to continue the air-fuel ratio enrichment even after the end of the deterioration determination. In this case, the determination that the NOx removing device 15 is normal is taken as a temporary determination, and when it is determined that the O2 sensor 19 is normal by the subsequent abnormality determination, the determination that the NOx removing device is normal is established. In contrast, if it is determined that the O2 sensor is abnormal after the temporary determination that the NOx removing device 15 is normal, the temporary determination is canceled, that is, it is regarded that the deterioration determination of the NOx removing device 15 is not ended.

This preferred embodiment supports claims 1 to 6. Specifically, steps S72 to S76 shown in FIG. 4 correspond to the deterioration determining means, and the processing shown in FIG. 5 corresponds to the abnormality determining means.

Second Preferred Embodiment

Figure 8:
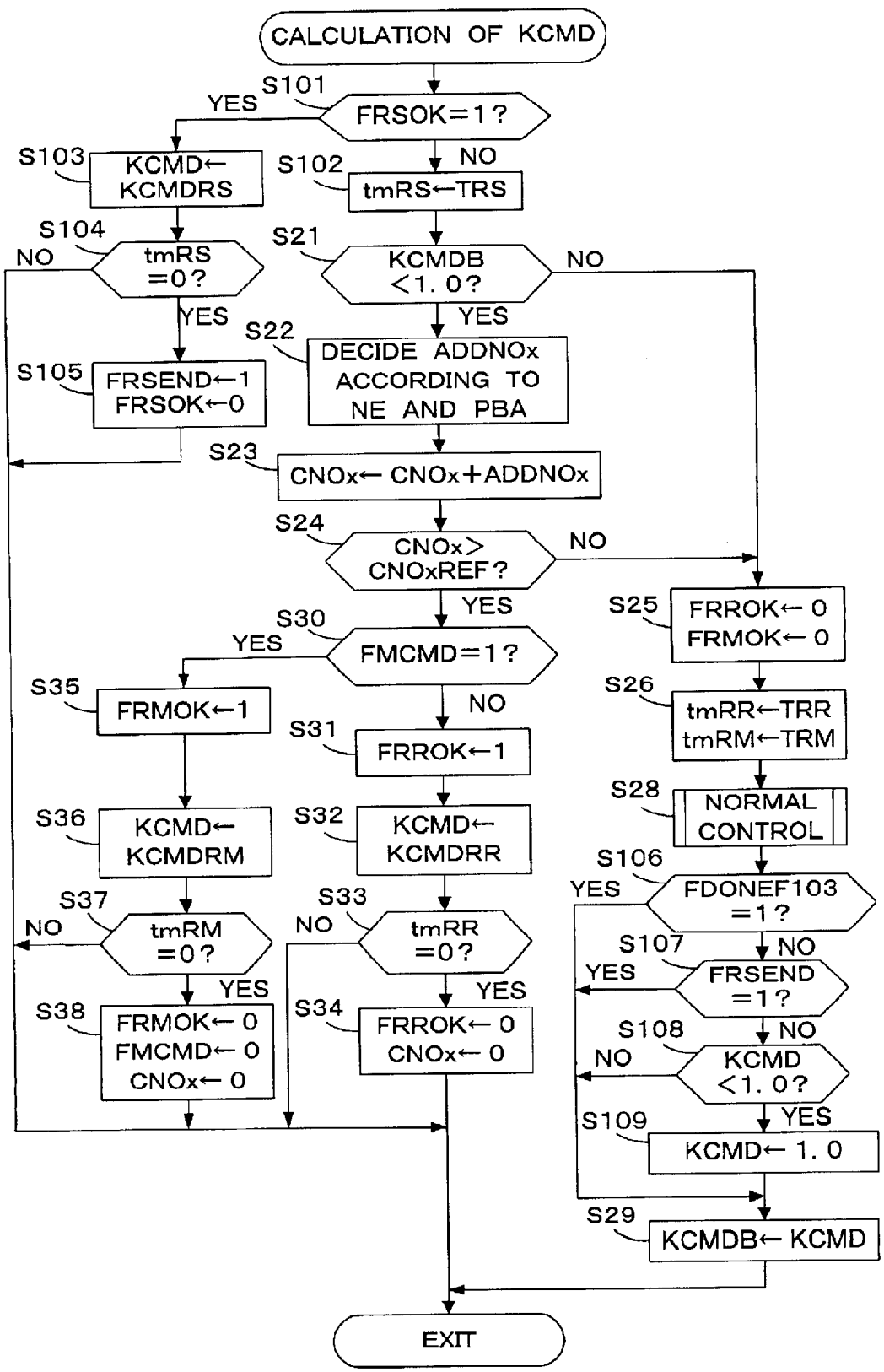
FIG. 8 is a flowchart showing a program for calculating a target air-fuel ratio coefficient (KCMD) in a second preferred embodiment of the present invention.
Figure 9:
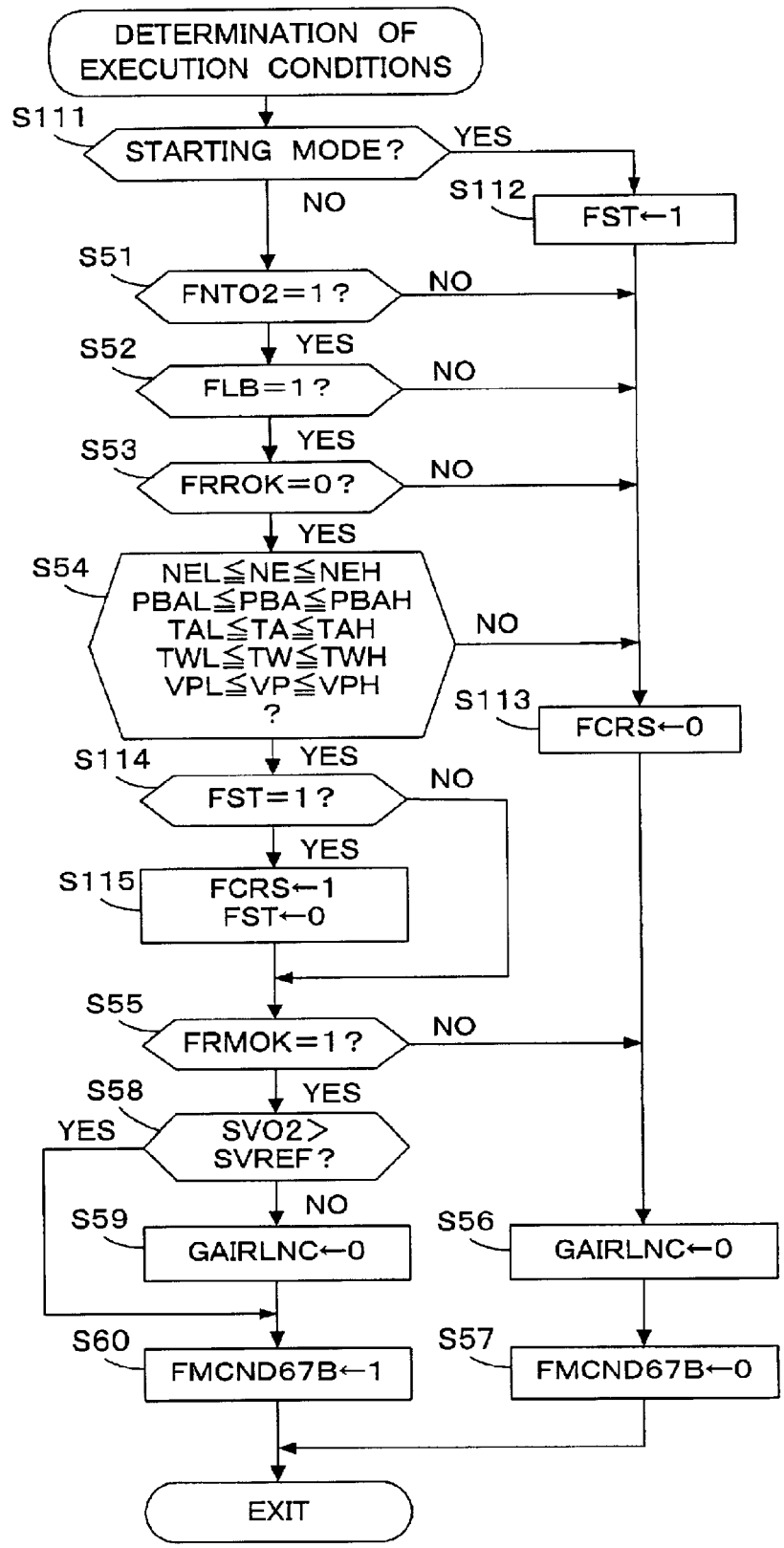
FIG. 9 is a flowchart showing a program for determining execution conditions for deterioration determination of the NOx removing device in the second preferred embodiment.
Figure 10:
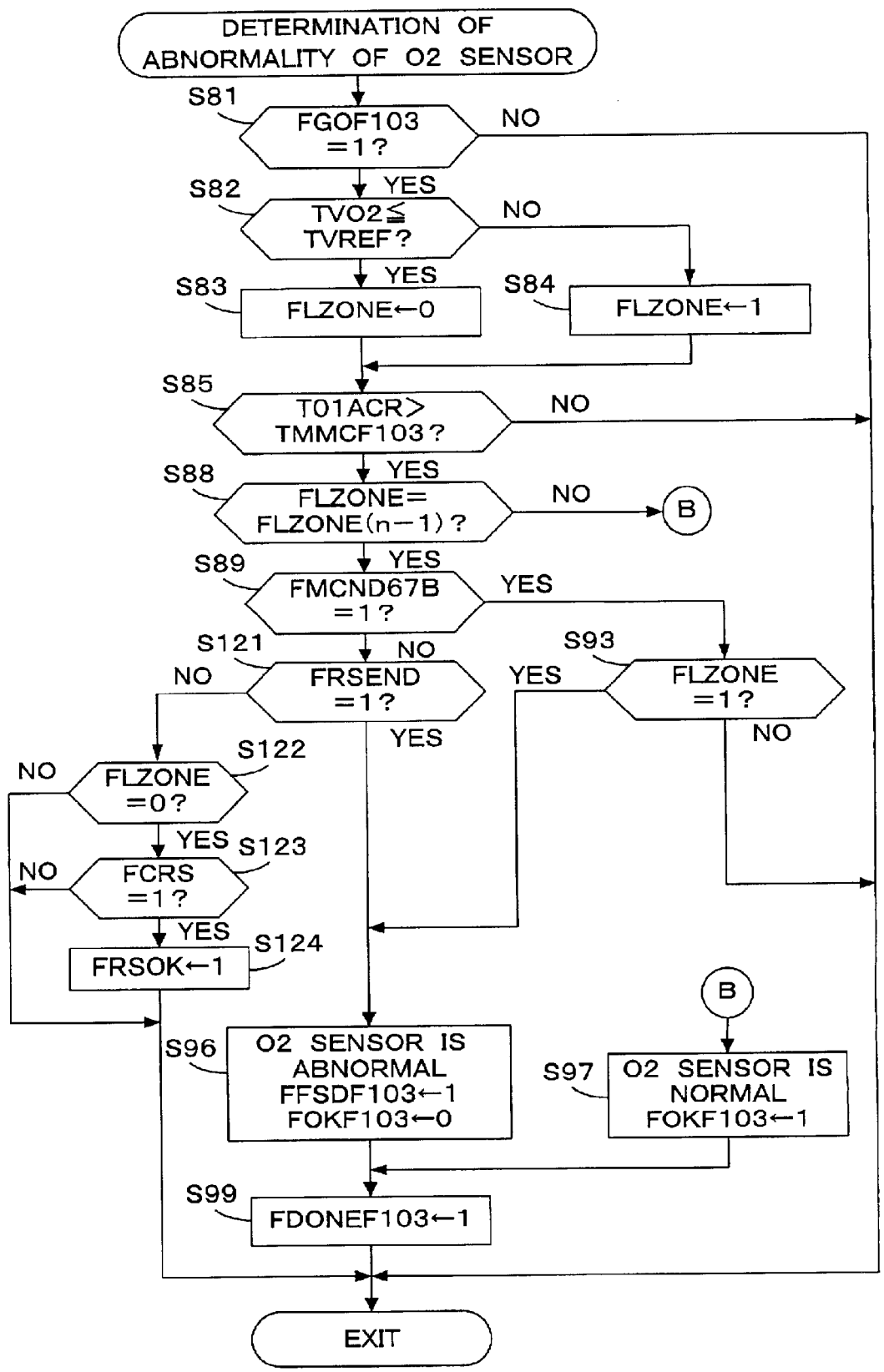
FIG. 10 is a flow chart for showing a program for executing abnormality determination of the oxygen concentration arranged downstream of the NOx removing device in the second preferred embodiment.

In this embodiment, it is intended to quickly determine an abnormality in the O2 sensor 19 when the output TVO2 from the O2 sensor 19 immediately after starting of the engine is kept at a value lower than the reference voltage TVREF. FIGS. 8 to 10 are flow charts showing programs respectively for executing the calculation of the target air-fuel ratio coefficient KCMD, the determination of execution conditions for deterioration determination of the NOx removing device, and the determination of abnormality of the O2 sensor according to this embodiment. This embodiment is the same as the first preferred embodiment except for the processings shown in FIGS. 8 to 10.

The processing shown in FIG. 8 is the same as that shown in FIG. 2, except that steps S101 to S109 are added to the processing shown in FIG. 2. In step S101, it is determined whether or not an abnormality determination enrichment flag FRSOK is set to "1". The flag FRSOK when set to "1" indicates that enrichment of the air-fuel ratio for abnormality determination of the O2 sensor should be executed. If FRSOK is "0", an abnormality determination enrichment time TRS (e.g., 5 sec) is set in a downcount timer tmRS to be referred to in step S104 described below and the timer tmRS is started (step S102). Thereafter, the program proceeds to step S21.

If the abnormality determination enrichment flag FRSOK is set to "1" (see step 124 shown in FIG. 10), the program proceeds from step 101 to step 103, in which the target air-fuel ratio coefficient KCMD is set to a predetermined abnormality determination enrichment value KCMDRS (for example, a value equivalent to an air-fuel ratio of 12.5, which is larger than the predetermined deterioration determination enrichment value KCMDRM). Then, it is determined whether or not the current value of the timer tmRS is "0". While tmRS is greater than "0", this program ends at once. If tmRS becomes "0", an abnormality determination enrichment end flag FRSEND is set to "1", indicating the end of the abnormality determination enrichment, and the abnormality determination enrichment flag FRSOK is reset to "0" (step S105). Then, this program ends.

Further, after the target air-fuel ratio coefficient KCMD is normally set according to the engine operating conditions in step S28, the program proceeds to step 106, in which it is determined whether or not the O2 sensor abnormality determination end flag FDONEF103 is "1". If FDONEF103 is "0", which indicates that the abnormality determination of the O2 sensor 19 is not ended, it is determined whether or not the abnormality determination enrichment end flag FRSEND is "1" (step S107).

If the abnormality determination of the O2 sensor 19 is ended (FDONEF103=1) or the abnormality determination enrichment is ended (FRSEND=1), the program directly proceeds to step S29. If FDONEF103 is "0" and FRSEND is "0", it is determined whether or not the target air-fuel ratio coefficient KCMD is less than "1.0" (step S108). If KCMD is greater than or equal to 1.0, the program proceeds directly to step S29, whereas if KCMD is less than 1.0, the program proceeds to step S29 after setting the coefficient KCMD to "1.0" (step S109).

In the processing shown in FIG. 8, when the abnormality determination enrichment flag FRSOK is set to "1" in step S124 shown in FIG. 10, the air-fuel ratio enrichment for the abnormality determination of the O2 sensor 19 is executed over the abnormality determination enrichment time TRS (steps 103 to S105). Until the abnormality determination of the O2 sensor 19 ends or the air-fuel ratio enrichment for abnormality determination ends, the lean operation is inhibited and the target air-fuel ratio coefficient KCMD is therefore set to 1.0 or more (steps S106 to S109).

The processing shown in FIG. 9 is the same as that shown in FIG. 3, except that steps S111 to S115 are added to the processing shown in FIG. 3. In step S111, it is determined whether or not the engine 1 is in the starting mode, that is, the engine 1 is cranking. If the engine 1 is in the starting mode, a starting flag FST is set to "1" (step S112), and a running flag FCRS is set to "0" (step S113). The running flag FCRS when set to "1" indicates that all of the answers to steps S51 to S54 become affirmative (YES) for the first time after starting of the engine. After step S113, the program proceeds to step S56.

After the end of starting of the engine 1, the program proceeds from step S111 to step S51, and then if all of the answers to steps S51 to S54 become affirmative (YES), it is determined whether or not the starting flag FST is "1" (step S114). Since FST is "1" at first, the running flag FCRS is set to "1" and the starting flag FST is reset to "0" (step S115). Thereafter, the program proceeds to step S55. Since the answer to step S114 becomes negative (NO) after the execution of step S115, the program directly proceeds from step S114 to step S55.

In the processing shown in FIG. 9, when all of the answers to steps S51 to S54 become affirmative (YES) for the first time after starting of the engine 1, the running flag FCRS is set to "1".

The processing shown in FIG. 10 is the same as that shown in FIG. 5, except that steps S86, S87, S90 to S92, S94, S95, and S98 are omitted, and that steps 121 to S124 are added to the processing shown in FIG. 5.

If a predetermined time TMMCF103 has elapsed after starting of the engine(step S85); the present rich flag FLZONE is continuously equal to the preceding rich flag FLZONE (n−1) (step S85), which means that the output TVO2 from the O2 sensor 19 is continuously at a value lower than or equal to the reference voltage TVREF or at a value higher than the reference voltage TVREF; and the execution condition flag FMCND67B is "0" (step S89), indicating that the deterioration determination execution conditions for the NOx removing device 15 are not satisfied, then the program proceeds from step S89 to step S121.

In step S121, it is determined whether or not the abnormality determination enrichment end flag FRSEND is "1". Since FRSEND is "0" at first, it is determined whether or not the rich flag FLZONE is "0" (step S122). If FLZONE is "0", which indicates that the output TVO2 from the O2 sensor 19 is lower than or equal to the reference voltage TVREF, it is determined whether or not the running flag FCRS set in step S115 of FIG. 9 is "1" (step S123). If FLZONE is "1" in step S122 or FCRS is "0" in step S123, this program ends at once. If FLZONE is "0" in step 122 and FCRS is "1" in step S123, the program proceeds to step S124, in which the abnormality determination enrichment flag FRSOK is set to "1", and this program ends.

If the abnormality determination enrichment flag FRSOK is set to "1" before the execution condition flag FMCND67B is set to "1" (step S124), the abnormality determination enrichment is executed according to the processing shown in FIG. 8. When TVO2 is lower than or equal to TVREF at the time the abnormality determination enrichment end flag FRSEND becomes "1", which indicates that the abnormality determination enrichment is ended, the program proceeds from step S121 to step S96, in which it is determined that the O2 sensor 19 is abnormal.

In the processing shown in FIG. 10, like the processing shown in FIG. 5, if the output TVO2 from the O2 sensor 19 changes before the execution condition flag FMCND67B is set to "1", it is determined that the O2 sensor 19 is normal (see steps S88 and S97), whereas if the output TVO2 from the O2 sensor 19 is kept at a value higher than the reference voltage TVREF when the execution condition flag FMCND67B is set to "1", it is determined that the O2 sensor 19 is abnormal (see steps S89, S93, and S96).

FIGS. 11A to 11D are time charts illustrating the abnormality determination in this embodiment. Like the time charts of FIGS. 6A to 6E, the engine 1 is started at a time t0, the lean operation is started at a time t2, the deterioration determination of the NOx removing device 15 is started at a time t4, and the deterioration determination thereof ends at a time t7. The output TVO2 from the O2 sensor immediately after starting of the engine 1 is lower than the reference voltage TVREF.

In this embodiment, if the abnormality determination enrichment flag FRSOK is set to "1" at a time t23 before starting of the lean operation, the air-fuel ratio enrichment for the abnormality determination of the O2 sensor 19 is executed. If the output TVO2 from the O2 sensor 19 changes to a value indicative of a rich air-fuel ratio, as shown by a broken line in FIG. 11D, at a time t21 or t22 before the time t23, it is determined that the O2 sensor 19 is normal. In this case, the air-fuel ratio enrichment for the abnormality determination is not executed. Further, if the output TVO2 from the O2 sensor 19 changes to a value indicative of a rich air-fuel ratio, as shown by a sold line in FIG. 11D, during the execution of the air-fuel ratio enrichment for the abnormality determination (in the period from the time t23 to the time t2), it is determined that the O2 sensor 19 is normal.

In contrast, as shown by a dashed line in FIG. 1D, if the output TVO2 from the O2 sensor 19 is kept at a value lower than the reference voltage TVREF when the air-fuel ratio enrichment for the abnormality determination ends at the time t2, it is determined that the O2 sensor 19 is abnormal.

In this way, according to this embodiment, in the case where the output TVO2 from the O2 sensor 19 is at a value lower than the reference voltage TVREF immediately after starting of the engine (the case where the O2 sensor 19 fails or the case where the O2 sensor 19 is initially activated, for example, at the time of hot restarting of the engine), the air-fuel ratio enrichment is executed before starting of the lean operation. If the output TVO2 from the O2 sensor 19 does not exceed the reference voltage TVREF during the execution of the air-fuel ratio enrichment, it is determined that the O2 sensor 19 is abnormal. That is, by executing the air-fuel ratio enrichment before NOx is newly absorbed in the NOx removing device 15, the oxygen concentration on the downstream side of the NOx removing device 15 can be reduced positively and quickly, so that the output TVO2 from the O2 sensor 19 in the exhaust rich condition can be quickly checked. As a result, it is possible to eliminate the need of continuation of the air-fuel ratio enrichment after the end of the deterioration determination of the NOx removing device 15, to thereby suppress the adverse effect of the air-fuel ratio enrichment on the exhaust emission characteristic and the drivability of the engine.

In this preferred second embodiment, steps S101 to S105 shown in FIG. 8, steps S111 to S115 shown in FIG. 9, and steps S122 to S124 shown in FIG. 10 correspond to the enrichment means. Steps S82 to S89 and S121 shown in FIG. 10 correspond to the abnormality determining means. Steps S106 to S109 shown in FIG. 8 correspond to the inhibiting means.

In the above-described embodiments, the proportional type air-fuel ratio sensor (oxygen concentration sensor) 17 is provided upstream of the three-way catalyst 14, and the binary type oxygen concentration sensors 18 and 19 are provided respectively upstream and downstream of the NOx removing device 15. The type and arrangement of each oxygen concentration sensor are not limited thereto. For example, all of the oxygen concentration sensors may be of either the proportional type or the binary type.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An exhaust emission control system for an internal combustion engine, comprising:

nitrogen oxides removing means provided in an exhaust system of said engine for removing nitrogen oxides in exhaust gases in a condition where an air-fuel ratio of an air-fuel mixture to be supplied to said engine is set to a lean region with respect to a stoichiometric ratio;

an oxygen concentration sensor provided downstream of said nitrogen oxides removing means for detecting the concentration of oxygen in the exhaust gases;

deterioration determining means for determining deterioration of said nitrogen oxides removing means on the basis of an output of said oxygen concentration sensor after the air-fuel ratio has been changed from the lean region to a rich region with respect to the stoichiometric ratio; and abnormality determining means for determining abnormality of said oxygen concentration sensor on the basis of an output of said oxygen concentration sensor during a period in which the air-fuel ratio is kept in the rich region with respect to the stoichiometric ratio immediately after execution of the deterioration determination by said deterioration determining means.

2. An exhaust emission control system according to claim 1, wherein the abnormality determination by said abnormality determining means is executed if the output of said oxygen concentration sensor is kept unchanged before the end of the deterioration determination by said deterioration determining means.

3. An exhaust emission control system according to claim 1, wherein said abnormality determining means determines that said oxygen concentration sensor is abnormal if the output of said oxygen concentration sensor is not changed from a value indicative of a lean air-fuel ratio to a value indicative of a rich air-fuel ratio within a predetermined period when the enrichment of the air-fuel ratio is continued over the predetermined period immediately after the end of the deterioration determination.

4. An exhaust emission control system according to claim 1, further comprising determination inhibiting means for inhibiting the abnormality determination by said abnormality determining means immediately after starting of said engine.

5. An exhaust emission control system for an internal combustion engine, comprising:

nitrogen oxides removing means provided in an exhaust system of said engine for removing nitrogen oxides in exhaust gases in a condition where an air-fuel ratio of an air-fuel mixture to be supplied to said engine is set to a lean region with respect to a stoichiometric ratio;

an oxygen concentration sensor provided downstream of said nitrogen oxides removing means for detecting the concentration of oxygen in the exhaust gases;

deterioration determining means for determining deterioration of said nitrogen oxides removing means on the basis of an output of said oxygen concentration sensor after said air-fuel ratio has been changed from the lean region to a rich region with respect to the stoichiometric ratio; and abnormality determining means for determining that said oxygen concentration sensor is abnormal if a condition where the output of said oxygen concentration sensor indicates that the air-fuel ratio is in the rich region with respect to the stoichiometric ratio continues before execution of the deterioration determination by said deterioration determining means.

6. An exhaust emission control system according to claim 5, further comprising determination inhibiting means for inhibiting the abnormality determination by said abnormality determining means immediately after starting of said engine.

7. An exhaust emission control system for internal combustion engine, comprising:

nitrogen oxides removing means provided in an exhaust system of said engine for removing nitrogen oxides in exhaust gases in a condition where an air-fuel ratio of an air-fuel mixture to be supplied to said engine is set to a lean region with respect to a stoichiometric ratio;

a downstream oxygen concentration sensor provided downstream of said nitrogen oxides removing means for detecting the concentration of oxygen in the exhaust gases;

enrichment means for setting the air-fuel ratio to a rich region with respect to the stoichiometric ratio when a condition where the output of said downstream oxygen concentration sensor indicates that the air-fuel ratio is in the lean region with respect to the stoichiometric ratio continues after the end of starting of said engine;

abnormality determining means for determining abnormality of said downstream oxygen concentration sensor on the basis of the output of said downstream oxygen concentration sensor during execution of the air-fuel enrichment by said enrichment means; and lean operation inhibiting means for inhibiting that the air-fuel ratio is set to the lean region with respect to the stoichiometric ratio until the end of the abnormality determination of said downstream oxygen concentration sensor.

8. An exhaust emission control system according to claim 7, wherein the enrichment of the air-fuel ratio by said enrichment means is allowed after starting of running of a vehicle on which said engine is mounted.

9. An exhaust emission control system according to claim 7, further comprising:

an upstream oxygen concentration sensor provided upstream of said nitrogen oxides removing means for detecting the concentration of oxygen in the exhaust gases; and deterioration determining means for determining deterioration of said nitrogen oxides removing means on the basis of an output of said downstream oxygen concentration sensor after said air-fuel ratio has been changed from the lean region to a rich region with respect to the stoichiometric ratio;

wherein said deterioration determining means comprises deterioration determination enrichment means for switching the air-fuel ratio from the lean region to the rich region with respect to the stoichiometric ratio, and a reducing component amount calculating means for calculating an amount of reducing components flowing into said nitrogen oxides removing means from the time when the output of said upstream oxygen concentration sensor has changed to a value indicative of a rich air-fuel ration after starting of the enrichment of the air-fuel ratio by said abnormality determination enrichment means;

said deterioration determining means determining deterioration of said nitrogen oxides removing means on the basis of the amount of the reducing components calculated by said reducing component amount calculating means and the output of said downstream oxygen concentration sensor.

10. An exhaust emission control system according to claim 9, wherein said deterioration determining means determines that said nitrogen oxides removing means is deteriorated if the output of said downstream oxygen concentration sensor indicates a rich air-fuel ratio when the amount of the reducing components has reached a predetermined amount.

11. An exhaust emission control system according to claim 9, wherein said reducing component amount calculating means calculates the amount of reducing components by integrating the amount of exhaust gases flowing into said nitrogen oxides removing means.

12. An exhaust emission control system according to claim 11, wherein said reducing component amount calculating means uses a basic fuel amount, which is set so that the air-fuel ratio becomes a constant value according to a rotational speed and an absolute intake pressure of said engine, as a parameter indicative of the amount of exhaust gases flowing into said nitrogen oxides removing device.

* * * * *